United States Patent
Yasui

(10) Patent No.: US 9,156,332 B2
(45) Date of Patent: Oct. 13, 2015

(54) VEHICULAR HEATING CONTROL SYSTEM, METHOD, AND COMPUTER-READABLE STORAGE MEDIUM

(75) Inventor: Keiji Yasui, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 84 days.

(21) Appl. No.: 13/695,735

(22) PCT Filed: Jun. 15, 2011

(86) PCT No.: PCT/JP2011/063721
§ 371 (c)(1),
(2), (4) Date: Nov. 1, 2012

(87) PCT Pub. No.: WO2012/172660
PCT Pub. Date: Dec. 20, 2012

(65) Prior Publication Data
US 2014/0110489 A1     Apr. 24, 2014

(51) Int. Cl.
*B60H 1/03* (2006.01)
*B60H 1/00* (2006.01)
(Continued)

(52) U.S. Cl.
CPC ........ *B60H 1/00642* (2013.01); *B60H 1/00285* (2013.01); *B60H 1/00764* (2013.01); *B60H 1/00828* (2013.01); *B60H 1/034* (2013.01); *B60N 2/0244* (2013.01); *B60N 2/5685* (2013.01); *B60W 10/06* (2013.01); *B60W 10/30* (2013.01); *B60W 20/00* (2013.01); *F02D 29/02* (2013.01); *F02N 11/0833* (2013.01); *B60H 1/32* (2013.01); *B60W 20/108* (2013.01);
(Continued)

(58) Field of Classification Search
CPC .......... B60H 1/00642; B60H 1/00285; B60H 1/034; B61D 27/0054; B60W 10/06; B60W 10/30; B60W 20/108; B60W 20/40; Y02T 10/48; Y02T 10/52; F23N 2041/14; F02D 41/042; F02N 11/0833
USPC ............................ 237/5, 8 A, 2 A, 12.3 B, 34
IPC ............................................... B60H 1/03, 1/02
See application file for complete search history.

(56) References Cited

U.S. PATENT DOCUMENTS

| | | | | |
|---|---|---|---|---|
| 6,213,233 B1 * | 4/2001 | Sonntag et al. | .......... | 180/65.245 |
| 7,886,988 B2 * | 2/2011 | Schwartz et al. | ........ | 237/12.3 R |

(Continued)

FOREIGN PATENT DOCUMENTS

| | | | | | |
|---|---|---|---|---|---|
| JP | 03005230 A | * | 1/1991 | ............... | B60H 1/00 |
| JP | 03032922 A | * | 2/1991 | ............... | B60H 1/00 |

(Continued)

*Primary Examiner* — Gregory Huson
*Assistant Examiner* — Daniel E Namay
(74) *Attorney, Agent, or Firm* — Oliff PLC

(57) ABSTRACT

A vehicular heating control system, method, and program acquire an operation value that is a setting by an occupant and, when there is no manual operation, acquire a fuel consumption reduction amount and a fuel consumption amount and, when the fuel consumption reduction amount exceeds the fuel consumption amount and an improvement in fuel economy is expected, execute seat heater control, that is, heating by an electrothermal heater, decrease the wind force of a blower fan, and lower an engine startup threshold value. Heating by an air conditioning system and heating by the electrothermal heater are combined, so a heating effect is obtained while reducing the fuel consumption amount.

10 Claims, 13 Drawing Sheets

(51) Int. Cl.
*F02N 11/08* (2006.01)
*F02D 29/02* (2006.01)
*B60W 10/06* (2006.01)
*B60W 10/30* (2006.01)
*B60N 2/56* (2006.01)
*B60N 2/02* (2006.01)
*B60H 1/02* (2006.01)
*B61D 27/00* (2006.01)
*B60H 1/32* (2006.01)
*F02D 41/04* (2006.01)
*B60W 20/00* (2006.01)

(52) U.S. Cl.
CPC .... *B60W2710/0688* (2013.01); *B61D 27/0054* (2013.01); *F02D 41/042* (2013.01); *F02N 2200/0809* (2013.01); *F02N 2200/0811* (2013.01); *F02N 2200/106* (2013.01); *Y02T 10/48* (2013.01); *Y02T 10/52* (2013.01)

(56) References Cited

U.S. PATENT DOCUMENTS

| | | | |
|---|---|---|---|
| 2005/0228553 A1* | 10/2005 | Tryon | 701/22 |
| 2010/0010732 A1* | 1/2010 | Hartman | 701/200 |
| 2010/0051366 A1* | 3/2010 | Junca et al. | 180/65.265 |
| 2010/0125402 A1* | 5/2010 | Bansal et al. | 701/117 |
| 2011/0288701 A1* | 11/2011 | Chen | 701/22 |
| 2012/0074238 A1* | 3/2012 | Morita et al. | 237/5 |
| 2012/0091214 A1* | 4/2012 | Rixen | 237/5 |
| 2012/0095670 A1* | 4/2012 | Piggott | 701/112 |
| 2014/0034266 A1* | 2/2014 | Tabei et al. | 165/42 |

FOREIGN PATENT DOCUMENTS

| | | | | |
|---|---|---|---|---|
| JP | 03065424 A * | 3/1991 | | B60H 1/00 |
| JP | U-5-18909 | 3/1993 | | |
| JP | 05185826 A * | 7/1993 | | B60H 1/00 |
| JP | 06234318 A * | 8/1994 | | B60H 1/00 |
| JP | A-2002-303171 | 10/2002 | | |
| JP | A-2006-138245 | 6/2006 | | |
| JP | A-2006-151039 | 6/2006 | | |
| JP | A-2007-230321 | 9/2007 | | |
| JP | A-2007-308133 | 11/2007 | | |
| JP | A-2011-27472 | 2/2011 | | |

* cited by examiner

VEHICULAR HEATING CONTROL SYSTEM, METHOD, AND COMPUTER-READABLE STORAGE MEDIUM

TECHNICAL FIELD

The present invention pertains to a vehicular heating control system, method, and computer-readable storage medium, and particularly relates to a vehicular heating control system, method, and computer-readable storage medium that control a heating system installed in a vehicle such as a hybrid automobile whose engine shuts down when the vehicle stops.

BACKGROUND ART

Vehicles that improve fuel economy by performing idling stop control that improves fuel economy by stopping idling when the vehicle stops traveling at an intersection and so forth and so forth have conventionally been proposed. Further, vehicles in which an engine and a motor are installed as drive sources improve fuel economy by shutting down the engine when the vehicle has stopped traveling.

There are many vehicular heating systems resulting from vehicular air conditioning systems. Heating by a vehicular air conditioning system uses the heat of engine cooling water as a heat source, so in a case where the temperature of the cooling water is low, a desired heating effect cannot be obtained. That is, in vehicles that perform idling stop control such as described above and hybrid automobiles that have a mode in which they shut down the engine and travel by motor during travel, if the temperature of the cooling water ends up dropping, a heating effect ends up becoming unobtainable.

Therefore, hybrid automobiles and so forth are configured in such a way that, on the basis of a threshold value of the temperature of the engine cooling water predetermined in accordance with a target temperature at outlet (TAO) of the vehicular air conditioning system, engine shutdown and engine startup are performed, a drop in the temperature of the cooling water is suppressed, and a heating effect is obtained.

Further, there are vehicle which, in addition to the heating effect resulting from the vehicular air conditioning system, are further equipped with a seat heater separately and obtain a heating effect. In vehicles equipped with such a seat heater, heating by the vehicular air conditioning system and the seat heater is performed in an operating mode (a so-called energy-saving mode) that improves fuel economy by shutting down the engine when the vehicle has stopped traveling. In order to improve fuel economy in an operating mode resulting from this energy-saving mode, in the technology described in JP-A No. 2006-151039, allowing an air conditioner and a seat heater to operate while keeping them below their normal working power when performing heating in the energy-saving mode is proposed. By keeping the air conditioner and the seat heater below their normal working power, they can be allowed to operate while keeping their outputs down in the energy-saving mode than in a normal operating mode, and fuel economy can be improved.

SUMMARY OF INVENTION

Technical Problem

However, seat heaters run on electric power supply, and in the technology described in JP-A No. 2006-151039, it is necessary to start up the engine to generate electric power in order to recover the electric power consumed by the seat heater. For this reason, the fuel consumption amount increases.

The present invention has been made in consideration of the above-described circumstances, and it is an object thereof to obtain a heating effect while reducing the fuel consumption amount.

Solution to Problem

In order to achieve the above-described object, a vehicular heating control system pertaining to a first aspect includes: fuel consumption reduction amount acquiring unit that acquires a fuel consumption reduction amount in an operating mode accompanied by an engine shutdown; fuel consumption amount acquiring unit for acquiring a fuel consumption amount corresponding to electric power consumption during heating by an electrothermal heater that heats the vehicle cabin interior with heat resulting from electric power supply and that is disposed separately from heating unit, which heats a vehicle cabin interior using engine cooling water as a heat source during heating; determining unit that determines that there exists a fuel economy improving state when the fuel consumption amount that has been acquired by the fuel consumption amount acquiring unit is less than the fuel consumption reduction amount that has been acquired by the fuel consumption reduction amount acquiring unit; and control unit that controls heating by the electrothermal heater when it has been determined by the determining unit that there exists a fuel economy improving state.

According to the vehicular heating control system pertaining to the first aspect, the fuel consumption reduction amount acquiring unit acquires a fuel consumption reduction amount in an operating mode accompanied by an engine shutdown. This fuel consumption reduction amount can be found by calculation. For example, the actual fuel consumption amount is acquired by detecting the fuel fluctuation amount in a predetermined certain amount of time. Because the operating mode is an operating mode accompanied by an engine shutdown, fuel consumption during the engine shutdown is suppressed. For this reason, for example, assuming a standard operating mode not accompanied by an engine shutdown, the fuel consumption amount when the vehicle has traveled for the predetermined certain amount of time in a standard traveling state (e.g., a predetermined engine speed) is found as a provisional fuel consumption amount. The difference between this provisional fuel consumption amount and the actual fuel consumption amount can be found as the fuel consumption reduction amount. Further, as the fuel consumption reduction amount, a predetermined prediction result can be acquired. For example, the fuel consumption reduction amount predicted in the certain amount of time can be stored as data, and the prediction result can be acquired by reading out this data. In this case, the vehicular heating control system can be equipped with detecting unit that detects the operating mode accompanied by an engine shutdown, and when that operating mode has been detected, the fuel consumption reduction amount that is the data corresponding to that operating mode can be used as the prediction result.

Further, the fuel consumption amount acquiring unit acquires a fuel consumption amount corresponding to electric power consumption during heating by an electrothermal heater that heats the vehicle cabin interior with heat resulting from electric power supply and that is disposed separately from heating unit, which heats a vehicle cabin interior using engine cooling water as a heat source during heating. As this fuel consumption amount, a detection result in which the fuel consumption amount has been directly detected may be acquired, or a prediction result may be acquired. An example of acquiring a detection result in which the fuel consumption amount has been directly detected is detecting and acquiring the electric power consumption amount in a predetermined certain amount of time. The fuel consumption amount can be acquired by converting this acquired electric power consumption amount into a fuel consumption amount. Further, as an example of acquiring a prediction result, the fuel consumption amount can be converted from the electric power consumption amount predicted in the predetermined certain amount of time and used as the prediction result. For example, the fuel consumption amount predicted in the certain amount of time can be stored as data, and the prediction result can be acquired by reading out this data. In this case, the vehicular heating control system can be equipped with detecting unit that detects the operating mode accompanied by an engine shutdown, and when that operating mode has been detected, the predetermined fuel consumption amount data corresponding to that operating mode can be used as the prediction result.

The determining unit determines that there exists a fuel economy improving state when the acquired fuel consumption amount is less than the acquired fuel consumption reduction amount. The control unit controls heating by the electrothermal heater when it has been determined by the determining unit that there exists a fuel economy improving state. That is, heating by the heating unit and heating by the electrothermal heater are combined when there exists a fuel economy improving state, so a heating effect can be obtained while reducing the fuel consumption amount.

A vehicular heating control system pertaining to a second aspect further includes traveling state detecting unit that detects a low-load traveling state in which the number of occurrences of engine shutdowns is equal to or greater than a predetermined number of occurrences, wherein the heating unit includes requesting unit in which a reference temperature of the engine cooling water for heating is predetermined and which makes an engine startup request or an engine shutdown request on the basis of the engine cooling water temperature and the reference temperature and changing unit that performs a change that lowers the reference temperature of the engine cooling water by a predetermined temperature in the operating mode accompanied by an engine shutdown, and the determining unit determines that there exists a fuel economy improving state when, in the operating mode accompanied by an engine shutdown that lowers the reference temperature of the engine cooling water by a predetermined temperature, the fuel consumption amount is less than the fuel consumption reduction amount and the detection result of the traveling state detecting unit is the low-load traveling state.

According to the vehicular heating control system pertaining to the second aspect, the traveling state detecting unit detects a low-load traveling state in which the number of occurrences of engine shutdowns is equal to or greater than a predetermined number of occurrences. For example, in a case where the vehicle frequently stops traveling at intersections or while waiting on traffic signals like in an urban area, fuel economy can be improved by performing idling stop control that improves fuel economy by stopping idling. Further, vehicles in which an engine and a motor are installed as drive sources can improve fuel economy by shutting down the engine when the vehicle has stopped traveling. These forms of control—idling stop control and control that shuts down the engine when the vehicle has stopped traveling—being performed, for example, can be detected as the low-load traveling state in which the number of occurrences of engine shutdowns is equal to or greater than the predetermined number of occurrences. As the number of occurrences of engine shutdowns, the number of shutdowns per certain amount of time may be detected.

The heating unit heats the vehicle cabin interior using the engine cooling water as a heat source during heating. For this reason, there are cases where, when the engine is shut down, the engine cooling water temperature drops and the heating effect drops, and for this reason, a reference temperature of the engine cooling water for heating is predetermined and the engine is started up or the engine is shut down from the engine cooling water temperature and the reference temperature to suppress the drop in the heating effect. For this reason, the heating unit includes the requesting unit and the changing unit. The requesting unit makes an engine startup request or an engine shutdown request on the basis of the engine cooling water temperature and the reference temperature. Further, the changing unit performs a change that lowers the reference temperature of the engine cooling water by a predetermined temperature in the operating mode accompanied by an engine shutdown The determining unit determines that there exists a fuel economy improving state when, in the operating mode accompanied by an engine shutdown that lowers the reference temperature of the engine cooling water by a predetermined temperature, the fuel consumption amount is less than the fuel consumption reduction amount and the low-load traveling state has been detected. Consequently, the number of occurrences of engine shutdowns can be increased by lowering the reference temperature of the engine cooling water by a predetermined temperature, and the fuel consumption reduction amount can be increased as a result of the number of occurrences of engine shutdowns being increased in the low-load traveling state. For this reason, although a fuel consumption amount arises due to heating by the electrothermal heater, the fuel consumption amount becomes less than the fuel consumption reduction amount, and a heating effect can be obtained while reducing the fuel consumption amount.

A vehicular heating control system pertaining to a third aspect further includes temperature acquiring unit that acquires the temperature of the vehicle cabin interior, wherein the heating unit includes requesting unit in which a reference temperature of the engine cooling water for heating is predetermined and which makes an engine startup request or an engine shutdown request on the basis of the engine cooling water temperature and the reference temperature and changing unit that performs a change that lowers the reference temperature of the engine cooling water by a predetermined temperature in the operating mode accompanied by an engine shutdown, and the determining unit determines that there exists a fuel economy improving state in the operating mode accompanied by an engine shutdown that lowers the reference temperature of the engine cooling water by a predetermined temperature and in a cold state where the temperature of the vehicle cabin interior that has been acquired by the temperature acquiring unit is less than a predetermined temperature.

According to the vehicular heating control system pertaining to the third aspect, the temperature acquiring unit acquires the temperature of the vehicle cabin interior. Further, the determining unit determines that there exists a fuel economy improving state in the operating mode accompanied by an engine shutdown that lowers the reference temperature of the engine cooling water by a predetermined temperature and in a cold state where the temperature of the vehicle cabin interior that has been acquired is less than a predetermined temperature. That is, in a cold state where the temperature of the vehicle cabin interior is low, early heating of the vehicle cabin interior is desired. Therefore, an early heating effect can be obtained by combining heating by the heating unit and heating by the electrothermal heater. Further, the number of occurrences of engine shutdowns can be increased by lowering the reference temperature of the engine cooling water by a predetermined temperature, and the fuel consumption reduction amount can be increased as a result of the number of occurrences of engine shutdowns being increased. For this reason, the fuel consumption amount becomes less than the fuel consumption reduction amount, and a heating effect can be obtained while reducing the fuel consumption amount.

In a vehicular heating control system pertaining to a fourth aspect, the heating unit includes air conditioning unit that calculates a target temperature at outlet of conditioned air for air conditioning the vehicle cabin interior and air conditions the vehicle cabin interior in such a way as to achieve the target temperature at outlet and which is equipped with heat applying unit that applies heat to the conditioned air using the engine cooling water as a heat source during heating, the electrothermal heater is at least at one of an occupant-contacting heater and an electric heater, and the control unit controls heating by the air conditioning unit and the electrothermal heater.

According to the vehicular heating control system pertaining to the fourth aspect, heating is performed by the air conditioning unit and the electrothermal heater. The air conditioning unit is include in the heating unit, calculates a target temperature at outlet of conditioned air for air conditioning the vehicle cabin interior, and air conditions the vehicle cabin interior in such a way as to achieve the target temperature at outlet. As for the heat source of heating by the air conditioning unit at this time, the conditioned air is heated by the heat applying unit resulting from the engine cooling water. The electrothermal heater is at least one of an occupant-contacting heater and an electric heater. In this way, due to heating by the air conditioning unit and the electrothermal heater, a heating effect can be obtained while reducing the fuel consumption amount.

In a vehicular heating control system pertaining to a fifth aspect, the temperature detecting unit further acquires at least one of the outside air temperature and the cooling water temperature, and the determining unit includes deciding unit that decides the cold state on the basis of the vehicle cabin interior temperature and at least one of the outside air temperature and the cooling water temperature that have been acquired by the temperature acquiring unit.

According to the vehicular heating control system pertaining to the fifth aspect, the temperature acquiring unit acquires the temperature of the vehicle cabin interior and at least one of the outside air temperature and the cooling water temperature. Further, the determining unit determines the fuel economy improving state from the cold state that has been decided by the deciding unit on the basis of the vehicle cabin interior temperature and at least one of the outside air temperature and the cooling water temperature that have been acquired. That is, the deciding unit decides the cold state from any temperature state of the vehicle cabin interior temperature and the outside air temperature, the vehicle cabin interior temperature and the cooling water temperature, and the vehicle cabin interior temperature and the cooling water temperature, and the determining unit determines the fuel economy improving state. For example, the determining unit determines, from the vehicle cabin interior temperature and the outside air temperature, the fuel economy improving state when the fuel consumption amount necessary for obtaining a heating effect is less than the fuel consumption reduction amount. Further, the determining unit determines, from the vehicle cabin interior temperature and the cooling water temperature, the fuel economy improving state when the fuel consumption amount necessary for obtaining a heating effect is less than the fuel consumption reduction amount. Further, the determining unit determines, from the vehicle cabin interior temperature and the outside air temperature and the cooling water temperature, the fuel economy improving state when the fuel consumption amount necessary for obtaining a heating effect is less than the fuel consumption reduction amount. Because of this, due to heating by the electrothermal heater, a heating effect can be obtained while reducing the fuel consumption amount.

In a vehicular heating control system pertaining to a sixth aspect, the air conditioning unit includes a blower fan that supplies the conditioned air to the vehicle cabin interior, and the control unit controls heating by the air conditioning unit by changing the wind force of the blower fan.

According to the vehicular heating control system pertaining to the sixth aspect, the control unit controls heating by changing the wind force of the blower fan. The changing of the wind force of the blower fan is lowering the wind force of the blower fan. By lowering the wind force of the blower fan, a drop in temperature resulting from the wind force of the blower fan in regard to the engine cooling water of the conditioned air that is the heat source can be suppressed, and the amount of time in which the engine is shut down can be lengthened. Because of this, even in heating by the air conditioning unit and the electrothermal heater, a heating effect can be obtained while reducing the fuel consumption amount.

In a vehicular heating control system pertaining to a seventh aspect, the control unit controls heating by the electrothermal heater by changing in stages the temperature of the heat resulting from electric power supply.

According to the vehicular heating control system pertaining to the seventh aspect, the control unit changes in stages the temperature of the heat resulting from electric power supply in regard to heating by the electrothermal heater, so the consumed electric power can be lowered in stages and the fuel consumption amount can be reduced.

A vehicular heating control system pertaining to an eighth aspect further includes seating position acquiring unit that acquires a seating position of an occupant, wherein the electrothermal heater is an occupant-contacting heater, and the control unit controls heating in regard to the electrothermal heater in the seating position of the occupant that has been acquired by the seating position acquiring unit.

According to the vehicular heating control system pertaining to the eighth aspect, the control unit controls heating in regard to the occupant-contacting heater in the seating position of the occupant, so heating can be controlled only with respect to an occupant wanting a heating effect, and the fuel consumption amount can be reduced compared to controlling heating in regard to all seats.

In the vehicular heating control system, the electrothermal heater can be an occupant-contacting heater, the vehicular heating control system can further include heater installation acquiring unit that acquires the installation position of the electrothermal heater, and the control unit can control heating in regard to the electrothermal heater in the position that has been acquired by the heater installation position acquiring unit.

Even in a case where heating is controllable in regard to an electrothermal heater in an occupant seating position in the vehicle cabin interior, there are cases where occupant-contacting heaters are not installed in all of the occupant seating positions of the vehicle cabin interior. For this reason, by configuring the control unit in such a way that it controls heating in regard to an electrothermal heater in an installed position, unnecessary control can be eliminated and the fuel consumption amount can be reduced.

Further, in the vehicular heating control system, the electrothermal heater can be an occupant-contacting heater, the vehicular heating control system can further include heater on/off acquiring unit that acquires the on/off state of the electrothermal heater, and the control unit can control heating in regard to the electrothermal heater in the on state of the electrothermal heater that has been acquired by the heater on/off acquiring unit.

There are electrothermal heaters in which on/off setting is possible by an operation by an occupant. Therefore, by configuring the control unit in such a way that it controls heating in regard to the electrothermal heater in the on state of the electrothermal heater, unnecessary control can be eliminated while reflecting the intention of the occupant and the fuel consumption amount can be reduced.

Moreover, in the vehicular heating control system, the control unit can include setting unit that sets the reference temperature of the engine cooling water to a temperature further lower than the predetermined temperature when the control unit controls heating by the electrothermal heater.

When the control unit controls heating by the electrothermal heater, a heating effect can be obtained while reducing the fuel consumption amount. Therefore, by configuring the control unit in such a way that the setting unit sets the reference temperature of the engine cooling water to a temperature further lower than the predetermined temperature, the fuel consumption reduction amount can be further increased as a result of the number of occurrences of engine shutdowns being further increased. For this reason, a heating effect can be obtained while improving the reduction in the fuel consumption amount.

A vehicular heating control method pertaining to a ninth aspect includes: a fuel consumption reduction amount acquiring step that acquires a fuel consumption reduction amount in an operating mode accompanied by an engine shutdown; a fuel consumption amount acquiring step that acquires a fuel consumption amount corresponding to electric power consumption during heating by an electrothermal heater that heats the vehicle cabin interior with heat resulting from electric power supply and that is disposed separately from heating unit, which heats a vehicle cabin interior using engine cooling water as a heat source during heating; a determining step that determines that there exists a fuel economy improving state when the fuel consumption amount that has been acquired by the fuel consumption amount acquiring step is less than the fuel consumption reduction amount that has been acquired by the fuel consumption reduction amount acquiring step; and a control step that controls heating by the electrothermal heater when it has been determined by the determining step that there exists a fuel economy improving state.

According to the vehicular heating control method pertaining to the ninth aspect, the method determines that there exists a fuel economy improving state and controls heating by the electrothermal heater when the fuel consumption amount corresponding to electric power consumption during heating by the electrothermal heater that heats the vehicle cabin interior is less than the fuel consumption reduction amount in the operating mode accompanied by an engine shutdown. Because of this, heating by the heating unit and heating by the electrothermal heater are combined when there exists a fuel economy improving state, so a heating effect can be obtained while reducing the fuel consumption amount.

A vehicular heating control program pertaining to a tenth aspect causes a computer to function as each unit of the vehicular heating control system according to any one of the first aspect to the seventh aspect. That is, the invention may also be configured as a vehicular heating control program that causes a computer to function as each unit of the vehicular heating control system according to any one of the first aspect to the seventh aspect. This program may be configured in such a way as to be circulatable by storing it in a recording medium.

Advantageous Effects of Invention

As described above, according to the present invention, the invention has the effect that, by controlling heating by the electrothermal heater when the fuel consumption amount corresponding to electric power consumption during heating by the electrothermal heater that heats the vehicle cabin interior is less than the fuel consumption reduction amount in the operating mode accompanied by an engine shutdown, heating by the heating unit and heating by the electrothermal heater are combined when there exists a fuel economy improving state, so a heating effect can be obtained while reducing the fuel consumption amount.

DESCRIPTION OF EMBODIMENTS

Examples of embodiments of the present invention will be described in detail below with reference to the drawings.

First Embodiment

Figure 2:
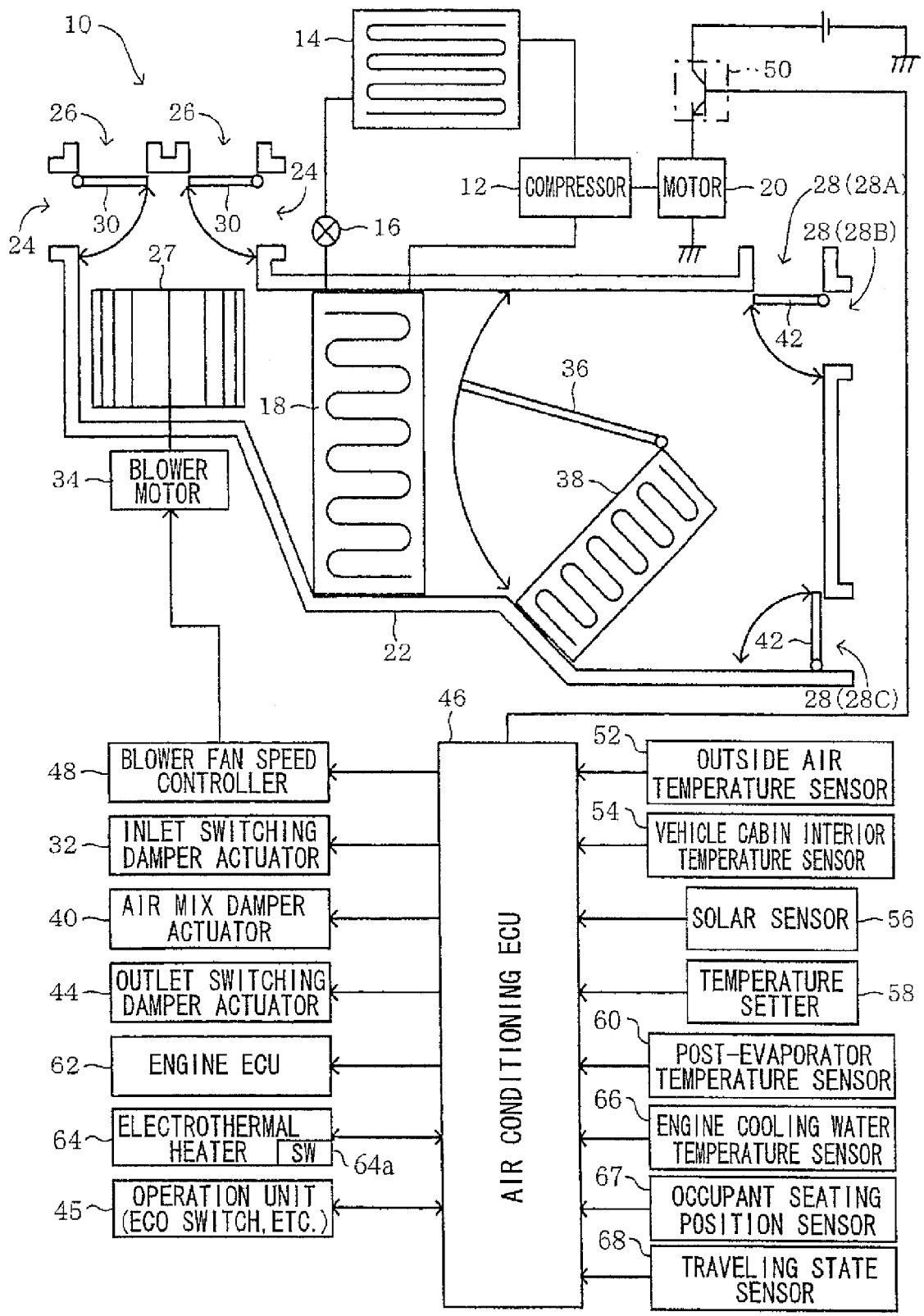
FIG. 2 is a block diagram showing the configuration of the vehicular air conditioning system pertaining to the first embodiment of the present invention.

FIG. 2 is a block diagram showing the schematic configuration of a vehicular heating system pertaining to a first embodiment of the present invention. In the present embodiment, a case where the heating function of a vehicular air conditioning system is used will be described. A vehicular air conditioning system will be described below as the vehicular heating system. Further, the vehicular air conditioning system pertaining to the present embodiment can be applied to a system that is installed in a hybrid automobile and is capable of air conditioning a vehicle cabin interior even during an engine shutdown.

In a vehicular air conditioning system 10 pertaining to the present embodiment, a refrigeration cycle is configured by a refrigerant circulation path that includes a compressor 12, a condenser 14, an expansion valve 16, and an evaporator 18.

The evaporator 18 cools air passing through this evaporator 18 (hereinafter called post-evaporator 18 air) by gasifying refrigerant that has been compressed and liquefied. At this time, the evaporator 18 is configured to cause moisture in the air to condense by cooling the air passing through the evaporator 18; because of this, the post-evaporator 18 air is dehumidified.

The expansion valve 16 disposed on the upstream side of the evaporator 18 is configured to turn the liquefied refrigerant into a mist by rapidly depressurizing the liquefied refrigerant and supply the mist refrigerant to the evaporator; because of this, the efficiency with which the refrigerant is gasified in the evaporator 18 is improved.

In the present embodiment, a motor-driven compressor is applied as the compressor 12 of the vehicular air conditioning system 10, and the compressor 12 is configured to be capable of circulating the refrigerant with a motor 20 even in a case where the compressor 12 does not operate on the power (e.g., the engine, the motor, etc.) of the vehicle. The compressor 12 may also be configured to be driven by the power of the vehicle when the power of the vehicle is operating.

The evaporator 18 of the vehicular air conditioning system 10 is disposed inside an air conditioning duct 22. Both ends of the air conditioning duct 22 are open, and air inlets 24 and 26 are formed in one open end. Plural air outlets 28 (in the present embodiment, 28A, 28B, and 28C are illustrated as an example) that open to the vehicle cabin interior are formed in the other open end.

The air inlets 26 are communicated with the outside of the vehicle and are configured to be capable of introducing outside air into the air conditioning duct 22. Further, the air inlets 24 are communicated with the vehicle cabin interior and are configured to be capable of introducing air (inside air) from the lower portion of the vehicle cabin interior into the air conditioning duct 22. In the present embodiment, the air outlets 28 are a defroster outlet 28A (DEF) that blows out air toward a windshield glass, a side and center register outlet 28B (Vent) that is capable of blowing out air toward the upper portion of the vehicle cabin interior, and a leg outlet 28C (Heat) that blows out air toward the lower portion of the vehicle cabin interior.

A blower fan 27 is disposed in the air conditioning duct 22 between the evaporator 18 and the air inlets 24 and 26. Further, inlet switching dampers 30 are disposed in the neighborhoods of the air inlets 24 and 26. The inlet switching dampers 30 exclusively open and close the air inlets 24 and 26 as a result of being actuated by an inlet switching damper actuator 32.

The blower fan 27 is driven to rotate by a blower motor 34, sucks air into the air conditioning duct 22 from the air inlets 24 or the air inlets 26, and further sends this air to the evaporator 18. At this time, outside air or inside air is introduced into the air conditioning duct 22 depending on the open/closed state of the air inlets 24 and 26 resulting from the inlet switching dampers 30. That is, an inside air circulation mode and an outside air circulation mode are switched between by the inlet switching dampers 30.

An air mix damper 36 and a heater core 38 are disposed on the downstream side of the evaporator 18. The air mix damper 36 is driven to turn by an air mix damper actuator 40 and adjusts the volume of the post-evaporator 18 air that passes through the heater core 38 and the volume of the post-evaporator 18 air that bypasses the heater core 18. Engine cooling water circulates in the heater core 38, and the heater core 38 uses the heat of the engine cooling water, to which heat has been applied by the engine, to apply heat to the air that has been guided to the heater core 38 by the air mix damper 36.

The post-evaporator 18 air is guided to the heater core 38 in accordance with the opening degree of the air mix damper 36, heat is applied to the post-evaporator 18 air by the heater core 18, the post-evaporator 18 air is further mixed with air to which heat has not been applied by the heater core 38, and the post-evaporator 18 air is thereafter sent to the air outlets 28. In the vehicular air conditioning system 10, the temperature of the air blown out into the vehicle cabin interior from the air outlets 28 is adjusted by controlling the air mix damper 36 to adjust the state of mixing between the post-evaporator 18 cool air and the warm air to which heat has been applied by the heater core 38.

Outlet switching dampers 42 are disposed in the neighborhoods of the air outlets 28. In the vehicular air conditioning system 10, the air outlets 28A, 28B, and 28C are opened and closed by these outlet switching dampers 42, whereby air whose temperature has been adjusted can be blown out into the vehicle cabin interior from desired positions. Actuation of the outlet switching dampers 42 is performed by driving an outlet switching damper actuator 44 in accordance with modes to which the vehicular air conditioning system 10 has been set.

Further, the vehicular air conditioning system 10 is equipped with an air conditioning ECU (Electronic Control Unit) 46 for performing various types of control of the vehicular air conditioning system 10. The inlet switching damper actuator 32, the air mix damper actuator 40, the outlet switching damper actuator 44, and a control switch 50 that controls the motor 20 that drives the compressor 12 to rotate are connected to the air conditioning ECU 46. Further, a blower fan speed controller 48 that controls the rotational speed of the blower fan 27 is connected to the air conditioning ECU 46. A power transistor or the like can be applied as the blower fan speed controller 48, and in a case where a power transistor is applied, the rotational speed of the blower fan 27 can be changed by changing the duty ratio of the voltage applied to the base of the power transistor.

An outside air temperature sensor 52, a vehicle cabin interior temperature sensor 54, a solar sensor 56, and a post-evaporator temperature sensor 60 are connected to the air conditioning ECU 46. Further, a temperature setter 58 for setting the temperature of the vehicular air conditioning system 10 and selecting the outlets 28 is connected to the air conditioning ECU 46, the values detected by the outside air temperature sensor 52, the vehicle cabin interior temperature sensor 54, the solar sensor 56, and the post-evaporator temperature sensor 60 are inputted to the air conditioning ECU 46, and the air conditioning ECU 46 is configured to perform various types of control according to the setting of the temperature setter 58 and so forth on the basis of the values detected by the sensors.

Further, an engine cooling water temperature sensor 66, an occupant seating position sensor 67, and a traveling state sensor 68 are connected to the air conditioning ECU 46. Further, an operation unit 45 for performing various types of operation of the vehicular air conditioning system 10 is connected to the air conditioning ECU 46, and the values detected by the operation unit 45, the cooling water temperature sensor 66, the occupant seating position sensor 67, and the traveling state sensor 68 are inputted to the air conditioning ECU 46. The air conditioning ECU 46 is configured to perform heating control, whose details will be described later, with these set values and detected values that are inputted to the air conditioning ECU 46.

Figure 3A:
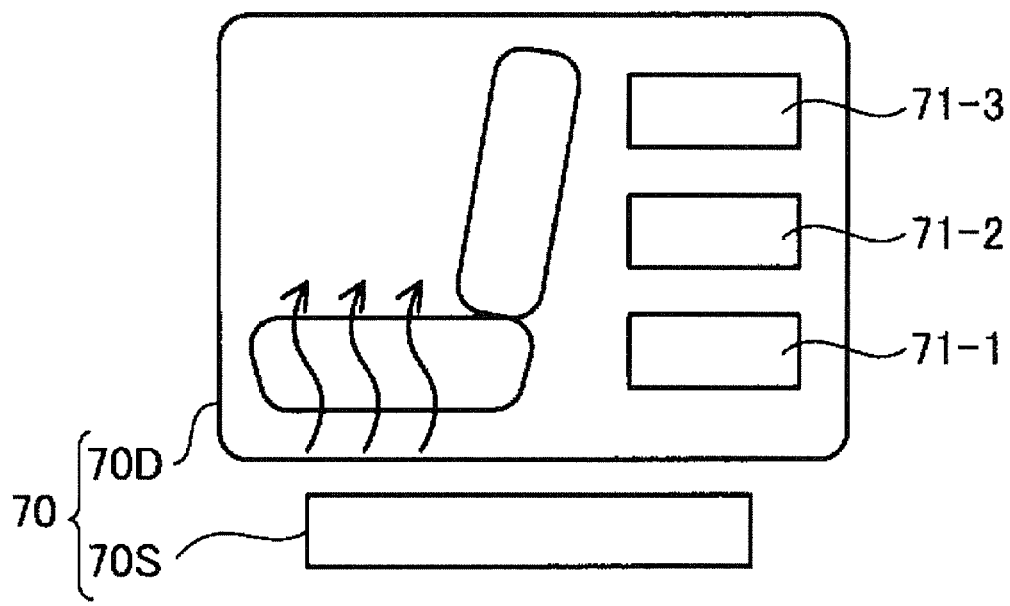
FIG. 3A and FIG. 3B are conceptual diagrams showing an operation display unit for manually operating an electrothermal heater, with FIG. 3A showing the operation display unit and FIG. 3B showing changes in the operating state of a seat heater resulting from instruction.
Figure 3B:
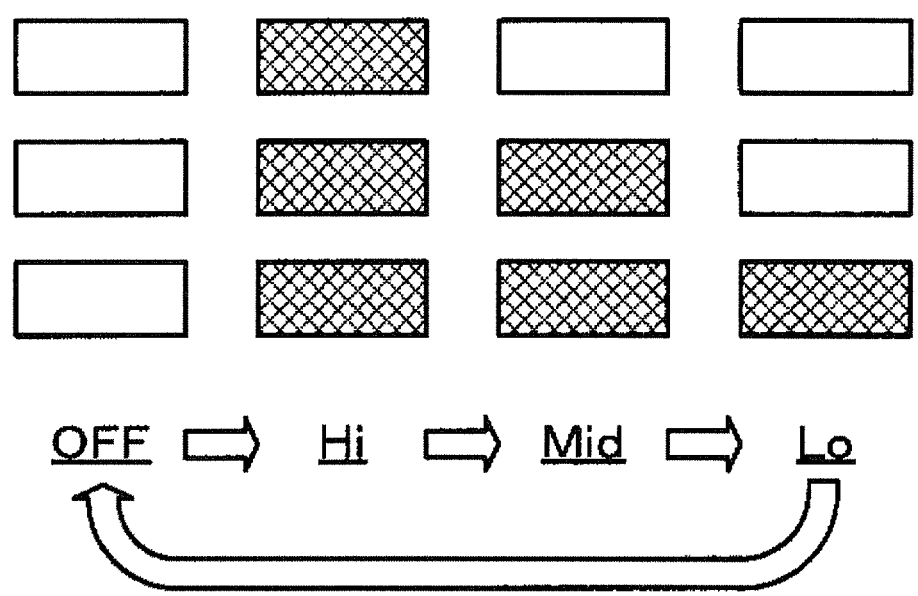

A heater operation display unit 70 for manually operating an electrothermal heater 64 is included in the operation unit 45. FIG. 3A and FIG. 3B show a configuration and a display state of the heater operation display unit for manually operating a seat heater when a seat heater is applied as the electrothermal heater 64. As shown in FIG. 3A, the heater operation display unit 70 is configured from a display unit 70D and an instruction switch 70S. Three lamps 71 that indicate the operating state (temperature) of the seat heater are disposed on the display unit 70D. Here, FIG. 3B shows a seat heater off state (OFF) where all of the lamps 71 are switched off, a seat heater low state (Lo) where the lamp 71-1 is switched on, a seat heater middle state (Mid) where the lamps 71-1 and 71-2 are switched on, and a seat heater high state (Hi) where all of the lamps 71-1, 71-2, and 71-3 are switched on. The temperature of the seat heater that is the electrothermal heater 64 can be manually set by operating the heater operation display unit 70. As shown in FIG. 3B, the heater operation display unit 70 is configured in such a way that, by pressing the instruction switch 70S, the operating state of the seat heater goes from the off state (OFF) to the high state (Hi), from the high state (Hi) to the middle state (Mid), from the middle state (Mid) to the low state (Lo), and then returns to the off state (OFF).

In the above description, a case where the manual operation of the electrothermal heater 64 is set in three stages has been described, but the manual operation of the electrothermal heater 64 is not limited to three stages and may also involve four or more stages or may involve two stages or simply switching the electrothermal heater 64 on and off.

The engine cooling water temperature sensor 66 may directly detect the engine cooling water or may indirectly detect the engine cooling water. For example, the engine cooling water temperature sensor 66 may detect the temperature of the heater core 38 in which the engine cooling water is circulated. The occupant seating position sensor 67 is for detecting the position of an occupant seated in a vehicular seat and whether or not there is an occupant seated in that vehicular seat. The traveling state sensor 68 is for detecting the traveling state of the vehicle. As the traveling state of the vehicle, a high-speed traveling state where the vehicle continuously travels at a vehicle speed exceeding a predetermined threshold value for a certain amount of time or more, a low-speed traveling state where the vehicle continuously travels at a vehicle speed equal to or less than a predetermined threshold value, and a stopping traveling state where the vehicle stops in a number of occurrences exceeding a predetermined threshold value in a certain amount of time can be applied. This stopping traveling state can be a low-load traveling state in a case where control accompanied by an engine shutdown is being performed in an idling state when the vehicle is stopped. In a case where the vehicle is equipped with a navigation system, the traveling state can also be determined by obtaining data relating to roadways and roadway environs such as expressways and urban areas from the navigation system.

The electrothermal heater 64 is disposed in the vehicle in which the vehicular air conditioning system 10 pertaining to the present embodiment is installed, heating by the vehicular air conditioning system 10 and heating by the electrothermal heater 64 are made possible, the electrothermal heater 64 is connected to the air conditioning ECU 46 of the vehicular air conditioning system 10, and the status of use of the electrothermal heater 64 is inputted to the air conditioning ECU 46. Further, the electrothermal heater 64 is equipped with a heater switch 64A for the occupant to switch the electrothermal heater 64 on and off. When a plurality of the electrothermal heaters 64 are installed, this heater switch 64A may be disposed individually for each of the electrothermal heaters 64 or the heater switch 64A may be a switch that collectively switches the electrothermal heaters 64A on and off. Further, the electrothermal heater 64 is disposed for heating the vehicle cabin interior, but the position where the electrothermal heater 64 is installed is a predetermined position, and the air conditioning ECU 46 is configured in such a way that the status of use of the electrothermal heater 64 (e.g., whether the electrothermal heater 64 is on or off) is inputted together with the position of the electrothermal heater 64 to the air conditioning ECU 46.

As the electrothermal heater 64, for example, either an occupant-contacting heater (a seat heater that applies heat to a vehicular seat, a steering wheel heater that applies heat to a steering wheel, etc.) or an electric heater (a halogen heater, a radiant heater, a PTC heater, etc.) or a combination of these can be applied. In the present embodiment, a case where a seat heater that applies heat to a vehicular seat is applied as the electrothermal heater 64 will be described. In the present embodiment, a case where the electrothermal heater 64 is used will be described, but an auxiliary heater such as a heat pump that utilizes a refrigeration cycle may also be applied instead of an electric heater, or an auxiliary heater may also be combined and applied.

Further, an engine ECU 62 is connected to the air conditioning ECU 46. The vehicular air conditioning system 10 is installed in a vehicle, and when the engine is switched off such as when the vehicle stops and the engine cooling water temperature drops, the amount of heat given off from the heater core 38 drops and a heating effect is no longer obtained, so the air conditioning ECU 46 is configured to perform an engine-on request and an engine-off request with respect to the engine ECU 62 on the basis of the engine cooling water temperature.

Specifically, engine-on request threshold values and engine-off request threshold values of the engine cooling water temperature that have been predetermined in accordance with target temperatures at outlet (TAO) are stored in the air conditioning ECU 46, and the air conditioning ECU 46 is configured to perform engine-on/off requests with respect to the engine ECU 46 on the basis of the engine-on request threshold values and the engine-off request threshold values. That is, the air conditioning ECU 46 requests an engine startup when the engine cooling water has not reached a preset temperature, for example. Because of this engine startup, the cooling water temperature rises and a desired air conditioning state is obtained.

In the present embodiment, a fuel saving effect is obtained by performing vehicle engine shutdown control. Therefore, the vehicular air conditioning system 10 is configured in such a way that a mode that keeps the fuel saving effect from being impaired can be set. That is, the vehicular air conditioning system 10 is configured in such a way that a fuel saving priority mode (hereinafter called an eco mode) that gives priority to the fuel saving effect and a comfort priority mode (hereinafter called a comfort mode) that gives priority to comfort in the vehicle cabin interior can be selected. An eco mode switch that switches between selecting and not selecting the eco mode (switches between the eco mode and the comfort mode) is included in the operation unit 45.

Figure 4:
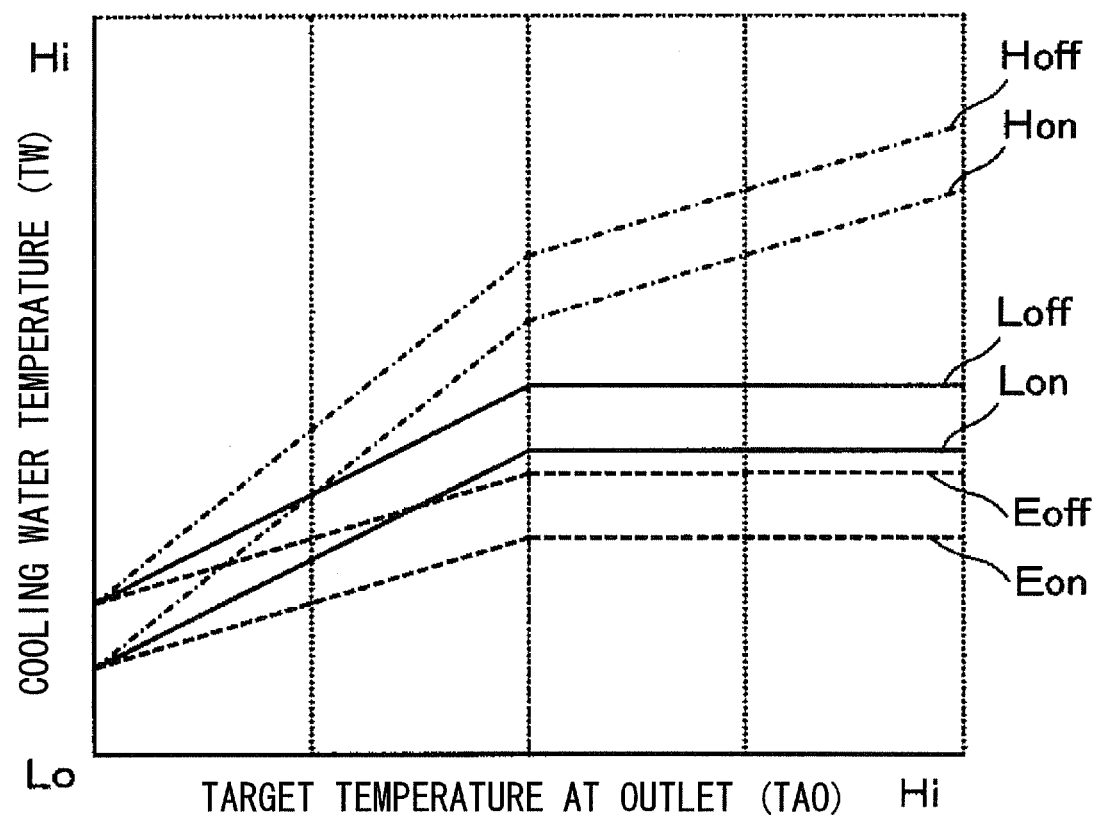
FIG. 4 is a diagram showing an example of engine-on request threshold values for performing engine-on requests at engine water temperatures that have been predetermined in accordance with target temperatures at outlet.

Consequently, threshold values of the cooling water temperature TW with respect to target temperatures at outlet TAO in the eco mode and threshold values of the cooling water temperature TW with respect to target temperatures at outlet TAO in the comfort mode are set in the air conditioning ECU 46. FIG. 4 shows an example of settings of threshold values of the cooling water temperature with respect to target temperatures at outlet TAO.

In the air conditioning ECU 46, boundary lines Hon and Hoff that are indicated by the long-dashed dotted lines in FIG. 4 are applied when performing an air conditioning operation in the comfort mode. The boundary line Hon on the lower side is a threshold value when requesting an engine startup, and the boundary line Hoff on the upper side is a threshold value applied to canceling a request for an engine startup (a request for an engine shutdown). Because of this, when performing an air conditioning operation in the comfort mode, the air conditioning ECU 46 does not request an engine startup in a state where the cooling water temperature TW exceeds the boundary line Hon with respect to the target temperature at outlet TAO, but the air conditioning ECU 46 requests an engine startup with respect to the engine ECU 62 when the engine cooling water temperature TW has fallen below the boundary line Hon with respect to the target temperature at outlet TAO. Further, the air conditioning ECU 46 cancels (switches off) the engine startup request when the cooling water temperature TW with respect to the target temperature at outlet TAO reaches the boundary line Hoff.

On the other hand, when the air conditioning ECU 46 is set to the eco mode, boundary lines Lon and Loff that are indicated by the solid lines in FIG. 4 and set to lower temperatures than the threshold values in the comfort mode are applied. In this way, because the boundary lines Lon and Loff are set in such a way that the cooling water temperature TW with respect to the target temperature at outlet TAO becomes lower than the boundary lines Hon and Hoff, even when the vehicle stops and the engine also shuts down, the engine is suppressed from being started up and a drop in fuel economy resulting from the engine being started up in a state where the vehicle is stopped is suppressed.

Further, in the present embodiment, when the electrothermal heater 64 is in use, it is expected that the feeling of warmth experienced by the occupant will become higher than the actual cabin temperature, so further different threshold values (lowered threshold values) are used to make it possible to change the threshold values and perform engine-on request control in accordance with the use of the electrothermal heater 64. Specifically, boundary lines Eon and Eoff indicated by the dashed lines in FIG. 4 are applied. Because of this, when the electrothermal heater 64 is in use, engine startups only for obtaining a heating effect can be suppressed, and a drop in fuel economy resulting from the engine being started up in a state where the vehicle is stopped can be suppressed.

Further, the vehicular air conditioning system 10 blows conditioned air into the vehicle cabin interior with the wind force of the blower fan 27. Therefore, when the vehicular air conditioning system 10 is set to the eco mode, the air conditioning ECU 46 is configured to suppress a drop in fuel economy by setting the wind force to a lower wind force than the wind force in the comfort mode. That is, during heating, when the vehicle stops and the engine shuts down, this ends up accelerating the drop in the temperature of the engine cooling water depending on the wind force of the blower fan 27. For this reason, in the eco mode, the air conditioning ECU 46 alleviates the drop in the temperature of the engine cooling water by making the wind force of the blower fan 27 lower by a predetermined amount than the wind force in the comfort mode—for example, to 80% of the wind force. Because of this, the amount of time in which the engine is shut down can be lengthened, and a drop in fuel economy resulting from the engine being started up in a state where the vehicle is stopped can be suppressed.

Here, when the electrothermal heater 64 is in use, it is expected that the feeling of warmth experienced by the occupant will become higher than the actual cabin temperature, so it is possible to further lower the wind force of the blower fan. Because of this, when the electrothermal heater 64 is in use, engine startups only for obtaining a heating effect can be suppressed, and a drop in fuel economy resulting from the engine being started up in a state where the vehicle is stopped can be suppressed.

Next, the operation of the vehicular air conditioning system 10 pertaining to the present embodiment will be described. The vehicular air conditioning system 10 of the present embodiment has a heating function and functions as a heating system equipped with the electrothermal heater 64. In the following description, a case where the vehicular air conditioning system 10 is equipped with the electrothermal heater 64 in a driver's seat and performs heating will be described as an example. Processing can be performed in the same way also in the case of another seat.

The vehicular air conditioning system 10 of the present embodiment is configured to perform air conditioning control (auto air conditioning control) in such a way as to maintain the temperature of the vehicle cabin interior at a predetermined set value on the basis of the detection results of the sensors. A summary of this auto air conditioning control will be described.

When an instruction to start air conditioning is given by the temperature setter 58 or the like, the air conditioning ECU 46 reads the values detected by the sensor values such as the outside air temperature sensor 52, the vehicle cabin interior temperature sensor 54, the solar sensor 56, and the post-evaporator temperature sensor 60 and reads the temperature set by the temperature setter 58. Next, the air conditioning ECU 46 finds the target temperature at outlet (TAO) and performs control in such a way that the temperature at outlet becomes the target temperature at outlet. Specifically, the air conditioning ECU 46 finds a mixing ratio (warm air/cool air), which is the ratio between the warm air that has passed through the heater core 38 and the cool air that has bypassed the heater core 38, and drives the air mix damper actuator 40 in such a way that the opening degree of the air mix damper 36 becomes an opening degree with which the found mixing ratio is achieved. Then, the air conditioning ECU 46 calculates a voltage to be applied to the blower motor 34 of the blower fan 27 from the target temperature at outlet in accordance with a predetermined map and outputs a signal to the blower fan speed controller 48, whereby blowing according to the target temperature at outlet is performed.

Figure 5:
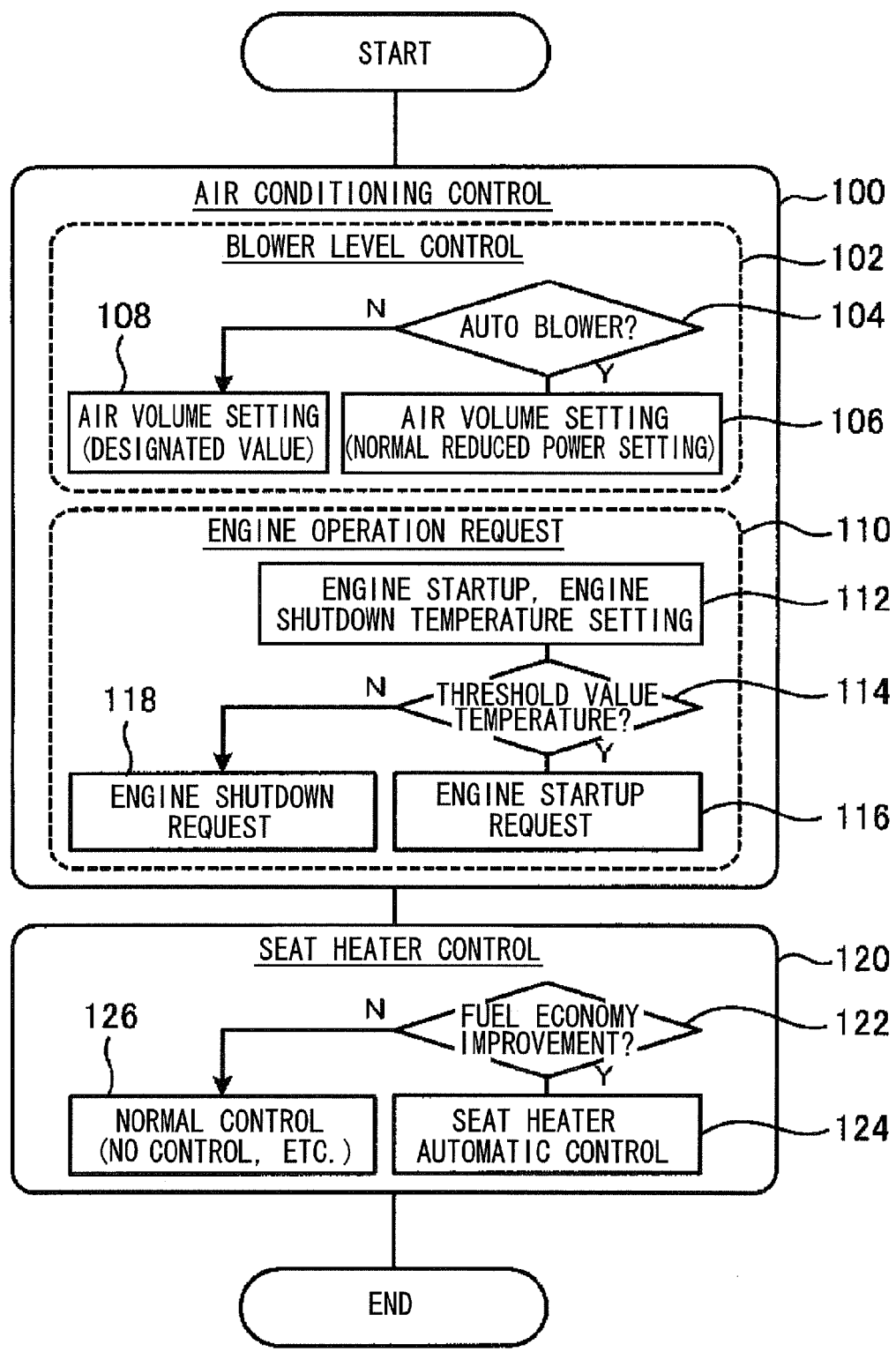
FIG. 5 is an explanatory diagram showing an example of a flow of processing steps in the air conditioning ECU of the vehicular air conditioning system.

Next, the process of heating control performed by the air conditioning ECU 46 of the vehicular air conditioning system 10 will be described. FIG. 5 is an explanatory diagram showing an example of a flow of processing steps in the air conditioning ECU 46 of the vehicular air conditioning system 10 of the present embodiment.

First, when heating control is started, the air conditioning ECU 46 advances to step 100 where the aforementioned air conditioning control step (auto air conditioning control) is started, and next, in step 120, seat heater control is executed in regard to the seat heater serving as the electrothermal heater 64. That is, in the present embodiment, heating control is performed with the air conditioning control and the electrothermal heater working in concert with each other.

In the present embodiment, the vehicular air conditioning system 10 can switch to either the eco mode or the comfort mode in such a way that a fuel saving effect is obtained by performing vehicle engine shutdown control. At this time, in a case where the eco mode has been set, in the air conditioning control of step 100, blower fan wind force control (step 102) and engine operation request control (step 110) are executed.

That is, in the blower fan wind force control, in step 104, the air conditioning ECU 46 discriminates whether or not wind force control of the blower fan 27 is an automatic setting, and in the case of manual, the air conditioning ECU 46 respects the instruction of the occupant and wind force setting resulting from the instructed value is performed (step 108). On the other hand, in the case of an automatic setting, wind force setting that makes the wind force of the blower fan 27 lower by a predetermined amount than the wind force in the comfort mode—for example, to 80% of the wind force—is performed (step 106). Because of this, the drop in the temperature of the engine cooling water can be alleviated, the amount of time in which the engine is shut down is lengthened, and a drop in fuel economy resulting from the engine being started up in a state where the vehicle is stopped can be suppressed.

Further, in the engine operation request control, in step 112, threshold values that have been set to lower temperatures than the threshold values in the comfort mode are set (FIG. 4). From this threshold value setting, an engine startup request (step 116) or an engine shutdown request (step 118) is judged by the relationship between the target temperature at outlet TAO and the cooling water temperature TW. Because of this, when the vehicle stops and the engine is also shut down, the amount of time in which the engine is started up can be lengthened and a drop in fuel economy resulting from the engine being started in a state where the vehicle is stopped can be suppressed.

Next, as for the seat heater control in step 120, details will be described later, but when a fuel consumption amount corresponding to electric power consumption during heating by the electrothermal heater is less than a fuel consumption reduction amount in an operating mode accompanied by an engine shutdown, the air conditioning ECU 46 judges that fuel economy can be improved (step 122) and executes the seat heater control, that is, heating by the electrothermal heater (step 124). On the other hand, when it has been discriminated that fuel economy cannot be improved, the air conditioning ECU 46 does not execute heating by the electrothermal heater (step 126). Because of this, heating by the air conditioning system and heating by the electrothermal heater are combined in a state where an improvement in fuel economy is expected, so a heating effect can be obtained while reducing the fuel consumption amount.

(Seat Heater Control)

Next, the seat heater control of step 120 will be described in detail.

Figure 1:
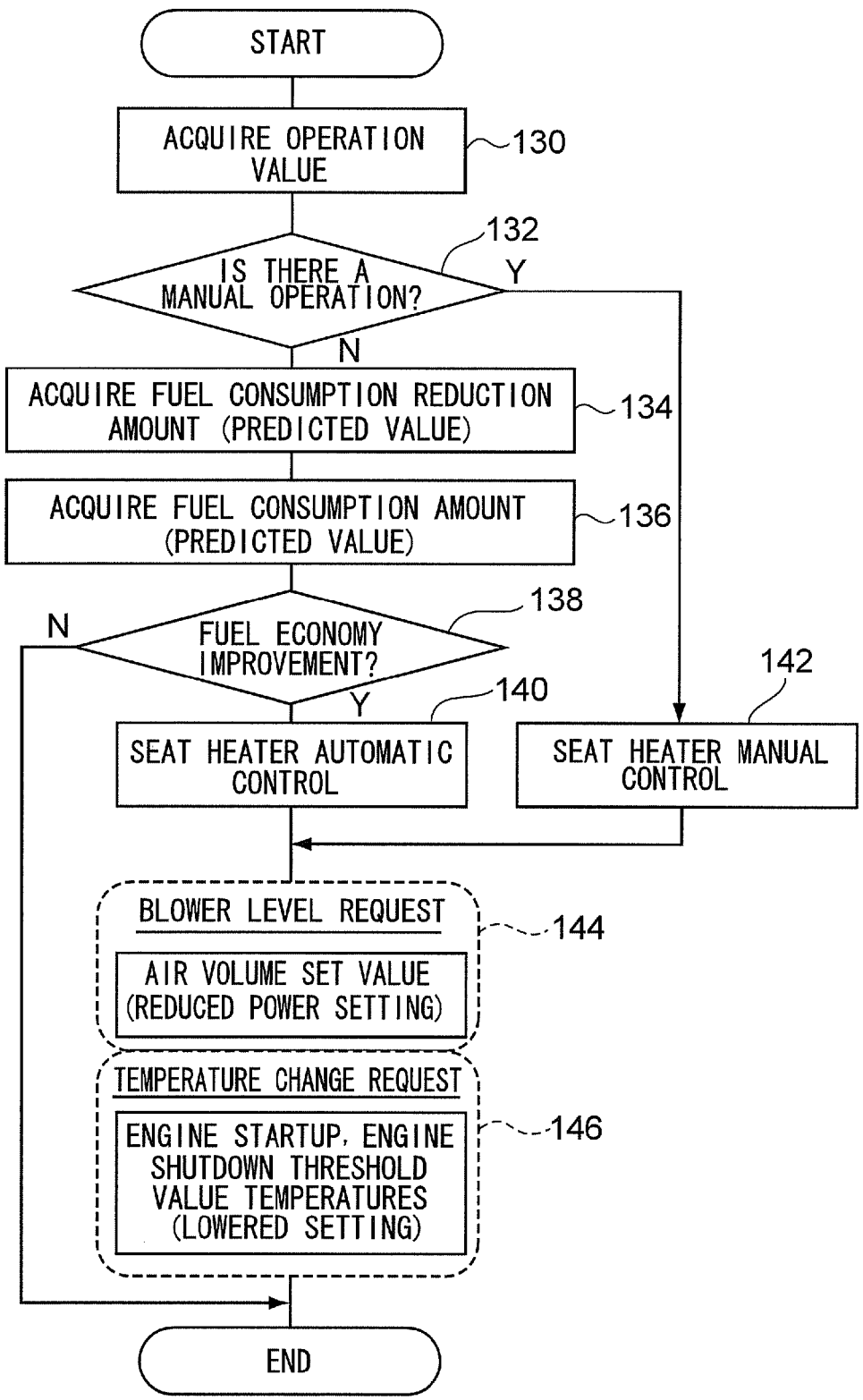
FIG. 1 is a flowchart showing a flow of processing in regard to seat heater control executed by an air conditioning ECU in a vehicular air conditioning system pertaining to a first embodiment of the present invention.

FIG. 1 shows, as a flowchart, a flow of processing in regard to the seat heater control executed by the air conditioning ECU 46 in the vehicular air conditioning system 10 of the present embodiment.

First, when the seat heater control is started, the air conditioning ECU 46 advances to step 130 where it acquires an operation value that is a setting resulting from an operation of the operation unit 45 by the occupant. Here, the air conditioning ECU 46 acquires an operation value as to whether or not the instruction switch 70S of the heater operation display unit 70 has been pressed. When the instruction switch 70S has been pressed, the air conditioning ECU 46 judges that a manual operation has been performed (YES in step 132), and in step 142 seat heater manual control is started. That is, control is performed in the operating state of the seat heater—any state of the off state (OFF), the high state (Hi), the middle state (Mid), and the low state (Lo)—according to the pressing of the instruction switch 70S.

Here, in a case where the seat heater manual control resulting from an instruction by the occupant has been executed, fuel economy can be improved when the seat heater that is the electrothermal heater 64 is operating. That is, when the electrothermal heater 64 is in use, it is expected that the feeling of warmth experienced by the occupant will become higher than the actual cabin temperature, so the threshold values of the air conditioning system can be made lower than in the eco mode regardless of automatic control or manual control (the boundary lines Eon and Eoff indicated by the dashed lines in FIG. 4). Further, the wind force of the blower fan 27 can be made lower than in the eco mode.

Therefore, the air conditioning ECU 46 advances to step 144 where it requests, when the electrothermal heater 64 is in operation, a change in the wind force of the blower fan 27 by outputting a wind force set value that makes the wind force of the blower fan 27 lower than the wind force in the eco mode so that, for example, it makes the wind force of the blower fan 27 lower by a predetermined amount than the wind force in the comfort mode—for example, to 70% of the wind force. Because of this, the drop in the temperature of the engine cooling water is alleviated, the amount of time in which the engine is shut down can be lengthened, and a drop in fuel economy resulting from the engine being started up in a state where the vehicle is stopped can be suppressed.

Next, in step 146, the air conditioning ECU 46 requests a temperature change that makes the threshold values of the air conditioning system lower than in the eco mode (the boundary lines Eon and Eoff indicated by the dashed lines in FIG. 4). Because of this, when the electrothermal heater 64 is in use, engine startups only for obtaining a heating effect can be suppressed, and a drop in fuel economy resulting from the engine being started up in a state where the vehicle is stopped can be suppressed.

On the other hand, when there is no instruction from the occupant, the answer in step 132 is NO and the air conditioning ECU 46 advances to step 134. In step 134, the air conditioning ECU 46 acquires a fuel consumption reduction amount. This fuel consumption reduction amount can be found by the amount of fuel that is consumed in an amount of time in which the engine is shut off in the operating mode accompanied by an engine shutdown. For example, an actual fuel consumption amount is acquired by detecting a fuel fluctuation amount in a predetermined certain amount of time. Meanwhile, a fuel consumption amount when the vehicle has traveled in a provisional traveling state (e.g., at a predetermined engine speed) where the vehicle has traveled in a standard operating mode not accompanied by an engine shutdown in this predetermined amount of time is found as a provisional fuel consumption amount. It suffices to find, as the fuel consumption reduction amount, the difference between this provisional fuel consumption amount and the actual fuel consumption amount. Further, the fuel consumption reduction amount can be obtained as a prediction result. In the present embodiment, a fuel saving effect is obtained by performing vehicle engine shutdown control. In regard to this operating mode, for example, fuel consumption reduction amounts predicted in certain amounts of time found beforehand by experiment or the like can be stored as data, and a prediction result can be obtained by reading out this data. In this case, it suffices to acquire, as a prediction result from an operating mode selection switch that detects that the operating mode is the operating mode accompanied by an engine shutdown, a fuel consumption reduction amount that is data corresponding to that operating mode when that operating mode has been detected.

In the next step 136, the air conditioning ECU 46 acquires a fuel consumption amount. As this fuel consumption amount, the air conditioning ECU 46 acquires, in regard to the amount of time for obtaining the fuel consumption reduction amount or an amount of time shorter than that, a fuel consumption amount corresponding to electric power consumption during heating by the electrothermal heater 64. As this fuel consumption amount, the air conditioning ECU 46 may acquire a detection result obtained by direct detection or may acquire a prediction result. For example, the air conditioning ECU 46 may detect and acquire an electric power consumption amount in the amount of time for obtaining the fuel consumption reduction amount. The air conditioning ECU 46 acquires the fuel consumption amount by converting this acquired electric power consumption amount into a fuel consumption amount. Further, in the case of obtaining the fuel consumption amount as a prediction amount, the air conditioning ECU 46 can obtain the fuel consumption amount as a prediction amount by converting the fuel consumption amount from a predicted electric power consumption amount when it has executed seat heater automatic control, whose details will be described later, in regard to the amount of time for obtaining the fuel consumption reduction amount. As for the prediction result of the fuel consumption amount, like the fuel consumption reduction amount, fuel consumption amounts predicted in certain amounts of time can also be stored, and a prediction result can be obtained by reading out this data.

Next, in step 138, the air conditioning ECU 46 judges whether or not fuel economy will be improved by determining that there exists a fuel economy improving state when the acquired fuel consumption amount is less than the acquired fuel consumption reduction amount, and when the answer is YES, the air conditioning ECU 46 advances to step 140. That is, when the fuel consumption amount corresponding to electric power consumption during heating by the electrothermal heater 64 is less than the fuel consumption reduction amount in the operating mode accompanied by an engine shutdown, the air conditioning ECU 46 judges that fuel economy can be improved and advances to step 140 where it executes the seat heater control, that is, heating by the electrothermal heater. On the other hand, when it has been discriminated that fuel economy cannot be improved (NO in step 138), the air conditioning ECU 46 ends the present routine without executing heating by the electrothermal heater 64.

Because of this, heating by the air conditioning system and heating by the electrothermal heater are combined in a state where an improvement in fuel economy is expected, so a heating effect can be obtained while reducing the fuel consumption amount.

Next, an example of the seat heater automatic control in step 140 will be described. Here, in consideration of electric power consumption resulting from continuous operation of the electrothermal heater 64, a case where the air conditioning ECU 46 timer-controls the temperature switching, in three stages (Lo, Mid, Hi), of the seat heater that is the electrothermal heater 64 will be described. That is, heating by the electrothermal heater 64 is configured to end automatically after a certain amount of time. The timer may be disposed as hardware, or counting may be performed by software.

Figure 8:
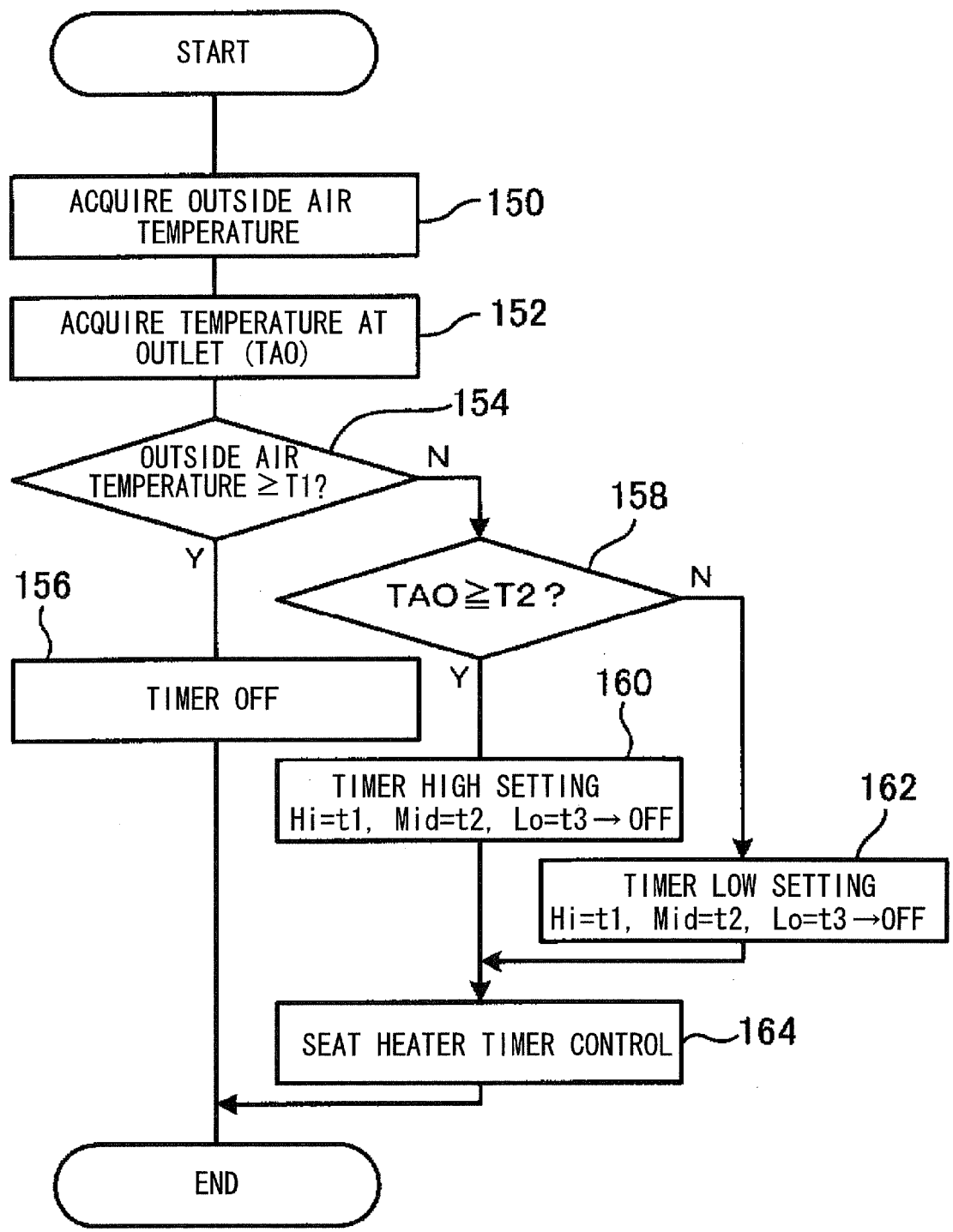
FIG. 8 is a flowchart showing a flow of processing of timer control in regard to seat heater automatic control executed by the air conditioning ECU.

FIG. 8 is a flowchart showing a flow of processing of timer control in regard to the seat heater automatic control executed by the air conditioning ECU 46 in the vehicular air conditioning system 10 of the present embodiment.

When the seat heater automatic control is started, the air conditioning ECU 46 acquires the outside air temperature in step 150 of FIG. 8 and acquires the target temperature at outlet TAO in the next step 152. That is, in the air conditioning ECU 46, as for the amount of time in which the electrothermal heater 64 is caused to operate, that is, the timer setting time, the air conditioning ECU 46 decides the outside air temperature and the target temperature at outlet (TAO) when it has discriminated that it will execute seat heater control by automatic control. As for this decision period, the point in time when the processing of step 104 of FIG. 1 starts is preferred, but it may also be from prior step 130 on. Next, the air conditioning ECU 46 sets corresponding timer setting times t1, t2, and t3 from the decided outside air temperature and target temperature at outlet (TAO). In the present embodiment, the air conditioning ECU 46 sets the timer setting times with a timer setting table shown in Table 1 below. This timer setting table is stored beforehand in the vehicular air conditioning system 10. During timer operation, the timer setting time that has been set is maintained even if the outside air temperature and the target temperature at outlet (TAO) fluctuate.

TABLE 1

| | | Timer Setting | | | |
|---|---|---|---|---|---|
| Outside Air Temperature | Target Temperature at Outlet (TAO) | Timer Setting Time | | | |
| | | t1 (Hi) | t2 (Mid) | t3 (Lo) | End |
| High (10 degrees or higher) | — | | Off | | |

TABLE 1-continued

| | | Timer Setting | | | |
|---|---|---|---|---|---|
| Outside Air Temperature | Target Temperature at Outlet (TAO) | Timer Setting Time | | | |
| | | t1 (Hi) | t2 (Mid) | t3 (Lo) | End |
| Low (less than 10 degrees) | High (50 degrees or higher) | 10 minutes | 15 minutes | 20 minutes | Off |
| | Low (less than 50 degrees) | 5 minutes | 5 minutes | 5 minutes | Off |

That is, in step 154, the air conditioning ECU 46 judges whether or not the outside air temperature is equal to or greater than a predetermined temperature T1 (e.g., 10 degrees), and when the answer is YES, in step 156 the air conditioning ECU 46 switches off the timer and ends the present routine. On the other hand, when the outside air temperature is less than the predetermined temperature T1 (e.g., 10 degrees) (NO in step 154), the air conditioning ECU 46 advances to step 158 where it judges whether or not the target temperature at outlet (TAO) is equal to or less than a predetermined temperature T2 (e.g., 50 degrees), and when the answer is YES, in step 160 the air conditioning ECU 46 sets the timer setting times t1, t2, and t3 to a high setting. When the target temperature at outlet (TAO) is less than the predetermined temperature T2 (e.g., 50 degrees) (NO in step 158), in step 162 the air conditioning ECU 46 sets the timer setting times t1, t2, and t3 to a low setting. In the next step 164, timer control is executed in accordance with the timer setting times that have been set. That is, the air conditioning ECU 46 starts heating by the electrothermal heater 64 by instructing the supply of electric power to the electrothermal heater 64 so as to achieve the target temperature in accordance with the timer setting times that have been set.

Figure 6:
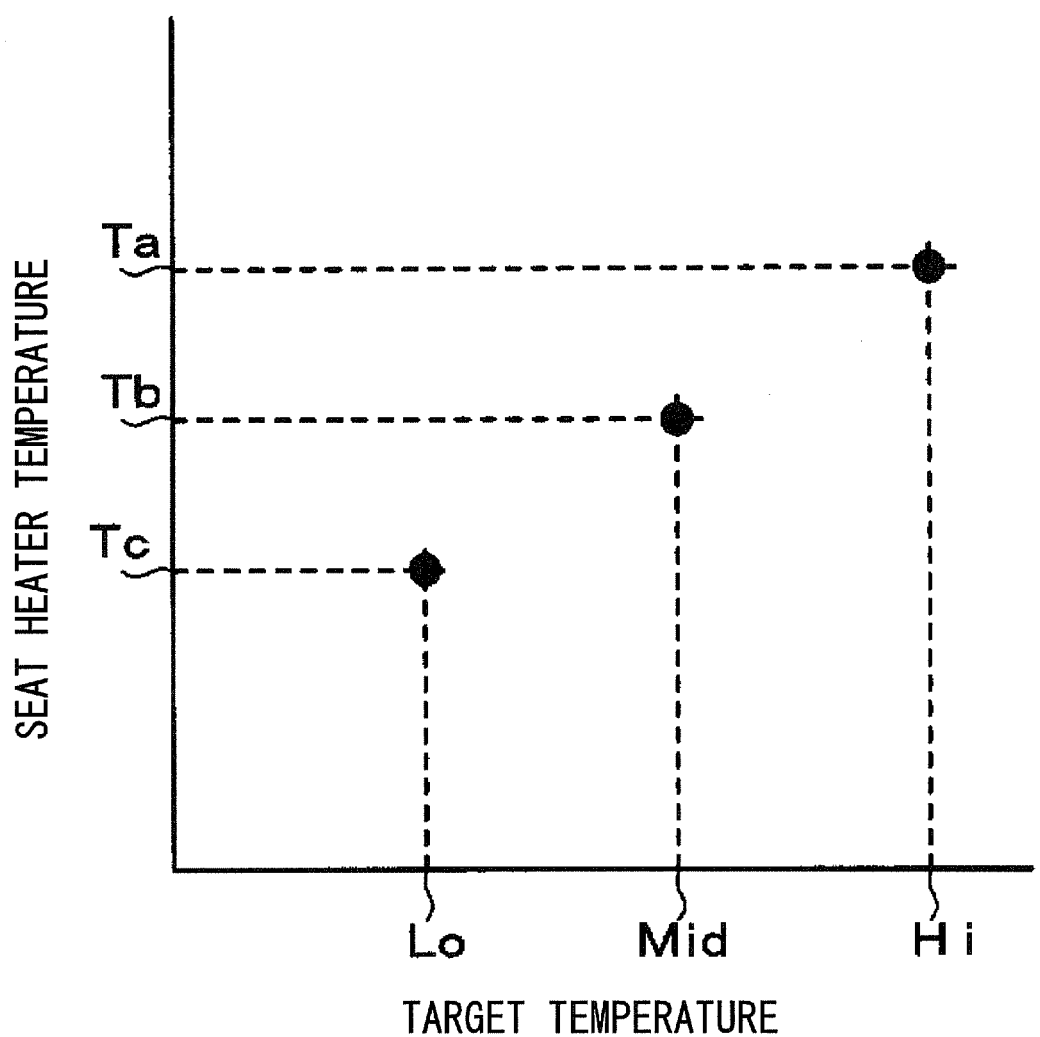
FIG. 6 is a diagram showing the relationship between target temperatures and actual temperatures of the electrothermal heater.
Figure 7:
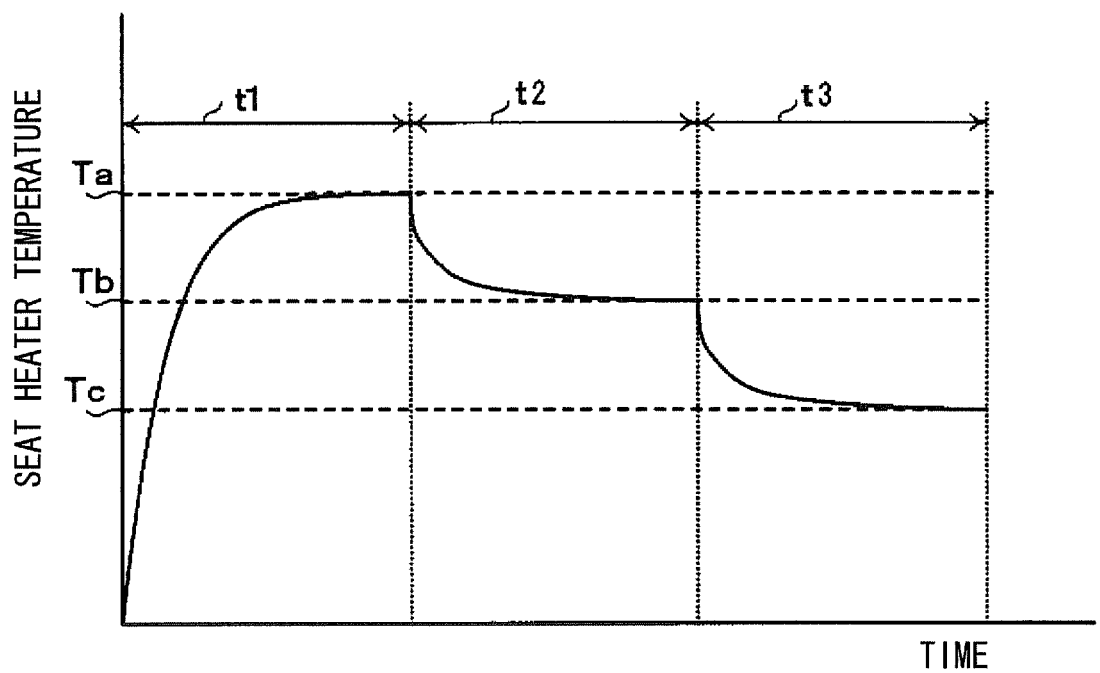
FIG. 7 is a diagram showing temperature changes when timer-controlling the temperature switching of the electrothermal heater in three stages.

FIG. 6 shows the relationship between target temperatures and actual temperatures of the electrothermal heater. As will be understood from the drawing, there is a relationship between the target temperatures (Lo<Mid<Hi) and the actual temperatures (Ta<Tb<Tc). The air conditioning ECU 46 instructs the supply of electric power so as to maintain the corresponding actual temperature (Ta, Tb, Tc) in regard to each of the target temperatures (Lo, Mid, Hi). FIG. 7 shows temperature changes when timer-controlling (timer setting times t1, t2, t3) the temperature switching, in three stages (Lo, Mid, Hi), of the seat heater that is the electrothermal heater 64 in a case where the outside air temperature and the target temperature at outlet are both low.

Even during timer operation (during timer control), the air conditioning ECU 46 gives priority to a manual operation in a case where an on/off instruction or a temperature setting change resulting from a manual operation has been performed. That is, the air conditioning ECU 46 instructs the supply of electric power so as to achieve the target temperature corresponding to the manual operation. In the case of this manual operation also, in consideration of electric power consumption, it is preferred that the supply of electric power to the electrothermal heater 64 be ended in a certain amount of time.

Further, in the above description, a case where the air conditioning ECU 46 timer-controls the temperature switching in three stages (Lo, Mid, Hi) in regard to the target temperature corresponding to the seat heater that is the electrothermal heater 64 has been described, but the air conditioning ECU 46 may also perform control with the actual temperature of the seat heater that is the electrothermal heater 64.

In this way, in the present embodiment, the air conditioning ECU 46 determines that there exists a fuel economy improving state when the fuel consumption amount is less than the fuel consumption reduction amount and controls heating by the electrothermal heater. That is, heating by the air conditioning system and heating by the electrothermal heater are combined when there exists a fuel economy improving state, so a heating effect can be obtained while reducing the fuel consumption amount.

The present embodiment is configured to use the engine cooling water as a heat source when air conditioning the vehicle cabin interior, use the engine as heat applying unit that applies heat to the heat source, and perform the engine-on request control in order to ensure a heat source, but the embodiment is not limited to this and may also, for example, be configured to use as the heat applying unit a heat pump that uses refrigerant compressed by a compressor driven in accordance with supplied electric power, use as the heat source a heat exchanger of the heat pump or the like, detect the temperature of the heat exchanger of the heat pump or the like, and perform compressor operation request control (a request to switch on the compressor or a request to change the speed of the compressor). For example, using a setting map of compressor speeds of the heat pump that have been predetermined in accordance with a target temperature at outlet at a normal time (in a case where the electrothermal heater 64 is not being used) and a setting map of compressor speeds (speeds that are lower compared to a case where the electrothermal heater 64 is not used) of the heat pump that have been predetermined in accordance with a target temperature at outlet in a case where the electrothermal heater 64 is being used, the embodiment may be configured to change the setting maps in accordance with the use of the electrothermal heater 64 and perform heat pump compressor operation request control. In this case, the power of the compressor of the heat pump is driven by electric power, so driving of the compressor at a speed greater than necessary can be suppressed, and it becomes possible to save electric power.

Further, in the present embodiment, when executing the seat heater control, the air conditioning ECU 46 judges whether or not there is a manual operation resulting from an operation of the instruction switch 70S of the heater operation display unit 70. The air conditioning ECU 46 may also be configured to judge whether or not there is a manual operation when the ignition switch is switched on. That is, an instruction resulting from a manual operation represents the intention of the occupant, so the air conditioning ECU 46 may be configured to give priority to and process this. For example, the air conditioning ECU 46 may be configured to end interrupt processing in steps 130 and 132 and when the answer is NO in step 132 and to execute interrupt processing that executes step 142 when the answer is YES in step 132. In the case of executing this step 142, when the seat heater automatic control is being executed, switching from automatic control to manual control is preferred.

Second Embodiment

Next, a vehicular air conditioning system pertaining to a second embodiment will be described. The present embodiment is an embodiment in which the present invention is applied to low-load travel where the vehicle frequently stops traveling at intersections and while waiting at traffic signals such as in an urban area. The basic configuration of the vehicular air conditioning system of the present embodiment is the same as that of the first embodiment, so in regard to identical portions, identical reference signs will be given thereto and detailed description thereof will be omitted.

Next, the operation during heating control in the vehicular air conditioning system 10 pertaining to the present embodiment will be described.

Figure 9:
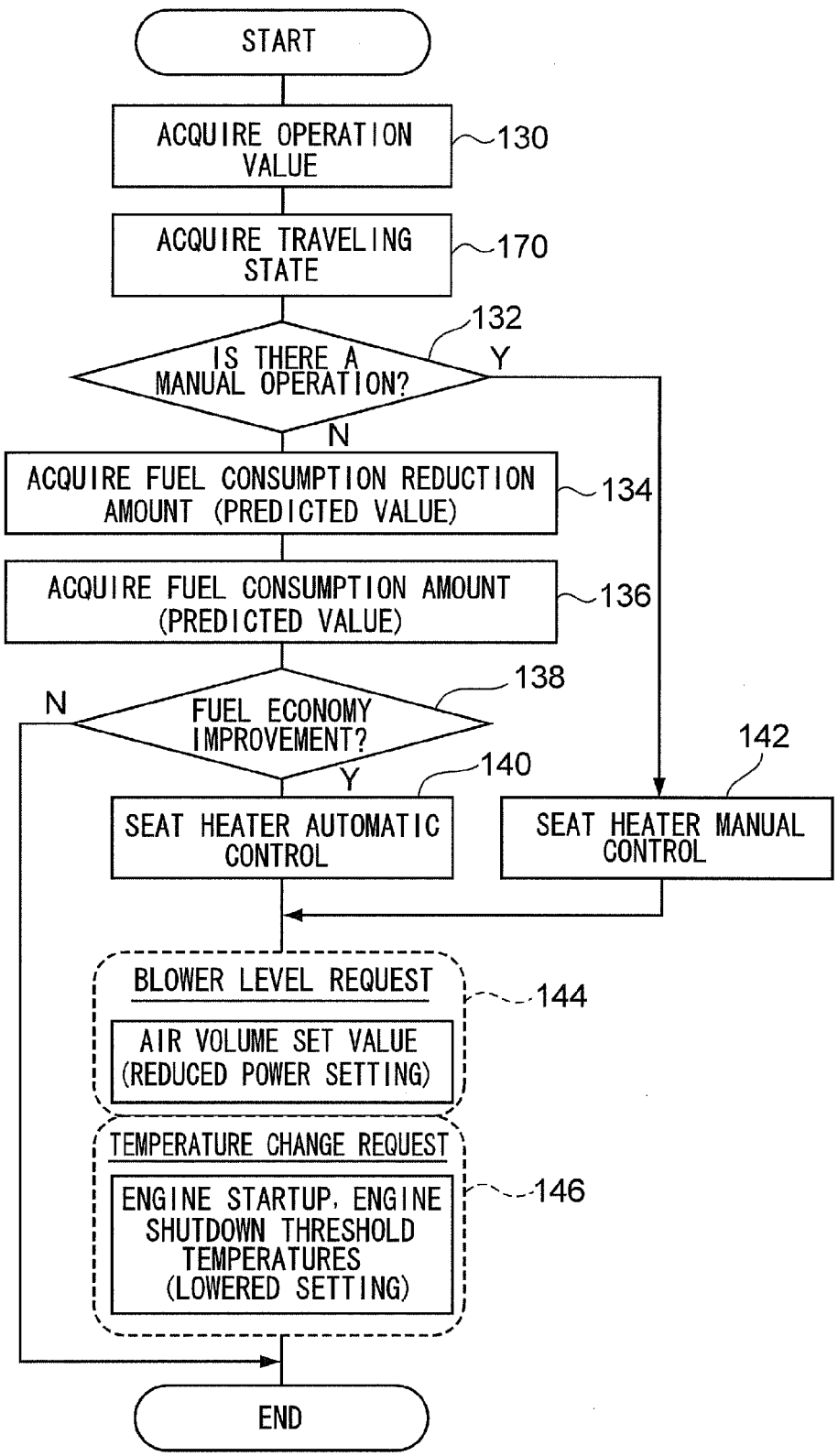
FIG. 9 is a flowchart showing a flow of processing of seat heater control executed by an air conditioning ECU in a vehicular air conditioning system of a second embodiment of the present invention.

FIG. 9 is a flowchart showing a flow of processing of the seat heater control executed by the air conditioning ECU 46 in the vehicular air conditioning system 10 of the present embodiment. What is different between FIG. 9 and FIG. 1 is that step 170 is added after step 130 in FIG. 9.

When the air conditioning ECU 46 acquires the operation value that is a setting resulting from an operation of the operation unit 45 by the occupant in step 130, the air conditioning ECU 46 advances to step 170 where it acquires the traveling state. Here, the air conditioning ECU 46 acquires the value of the traveling state sensor 68. That is, the traveling state of the vehicle is detected by the traveling state sensor 68. The traveling state of the vehicle includes, as described above, a high-speed traveling state, a low-speed traveling state, a stopping traveling state, and so forth. Here, in regard to the stopping traveling state, in a case where control accompanied by an engine shutdown is being performed in an idling state when the vehicle is stopped, the air conditioning ECU 46 acquires the operation value as the low-load traveling state. In a case where the vehicular air conditioning system 10 is equipped with a navigation system as described above, the air conditioning ECU 46 may also acquire the operation value from the navigation system.

Next, when there is no manual operation by the occupant (NO in step 132), the air conditioning ECU 46 acquires the fuel consumption reduction amount (step 134), acquires the fuel consumption amount (step 136), and judges whether or not fuel economy will be improved (step 138). Then, when the result of the judgment is that fuel economy will be improved (YES in step 138), the air conditioning ECU 46 executes the seat heater control, that is, heating by the electrothermal heater.

In the present embodiment, in step 130 the air conditioning ECU 46 acquires data indicating whether or not the eco mode has been selected by an instruction resulting from the eco mode switch. Further, in judging whether or not it is possible to improve fuel economy in step 138, the air conditioning ECU 46 performs the judgment including the facts that the eco mode has been selected and the traveling state is the low-load traveling state. That is, the air conditioning ECU 46 judges that fuel economy will be improved when the fuel consumption amount is less than the fuel consumption reduction amount, the fuel-saving effect is given priority, the threshold value for an engine startup is lowered, and the traveling state is the low-load traveling state where the vehicle travels in an urban area or the like. Because of this, in vehicle travel (an operating mode) accompanied by an engine shutdown, the number of occurrences of engine shutdowns can be increased by lowering the reference temperature of the engine cooling water by a predetermined temperature, and the fuel consumption reduction amount can be increased as a result of the number of occurrences of engine shutdowns being increased in the low-load traveling state. For this reason, although a fuel consumption amount arises due to heating by the electrothermal heater, the fuel consumption amount becomes less than the fuel consumption reduction amount or the fuel consumption amount resulting from the electrothermal heater is offset by the fuel consumption reduction amount, and a heating effect can be obtained while reducing the fuel consumption amount.

In the above description, a case where the air conditioning ECU 46 acquires the fuel consumption reduction amount and the fuel consumption amount has been described, but when the eco mode has been selected and the traveling state of the vehicle is the low-load traveling state, it can be expected that the fuel consumption amount will become less than the fuel consumption reduction amount. For this reason, when the air conditioning ECU 46 has acquired the facts that the eco mode has been selected and the traveling state of the vehicle is the low-load traveling state, it may use this acquired value as a predicted value for proceeding to step 140 instead of the processing of acquiring the fuel consumption reduction amount and the fuel consumption amount (steps 134 and 136) and judging fuel economy improvement (YES in step 138).

Third Embodiment

Next, a vehicular air conditioning system pertaining to a third embodiment will be described. The present embodiment is an embodiment in which the present invention is applied when obtaining a heating effect in a cold state where the vehicle cabin interior temperature is low, for example. The basic configuration of the vehicular air conditioning system of the present embodiment is the same as that of the first embodiment, so in regard to identical portions, identical reference signs will be given thereto and detailed description thereof will be omitted.

Next, the operation during heating control in the vehicular air conditioning system 10 pertaining to the present embodiment will be described.

Figure 10:
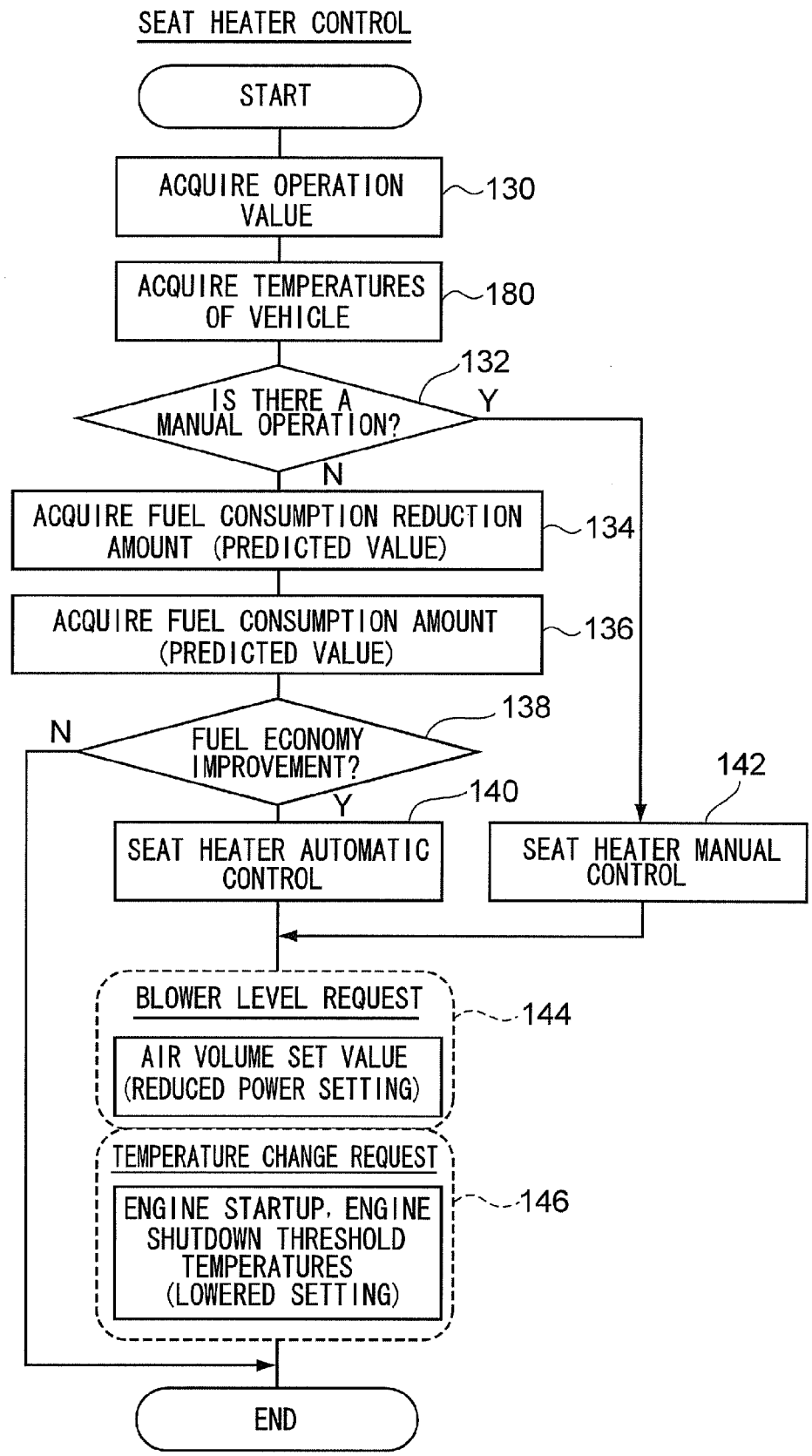
FIG. 10 is a flowchart showing a flow of processing of seat heater control executed by an air conditioning ECU in a vehicular air conditioning system of a third embodiment of the present invention.

FIG. 10 is a flowchart showing a flow of processing of the seat heater control executed by the air conditioning ECU 46 in the vehicular air conditioning system 10 of the present embodiment. What is different between FIG. 10 and FIG. 1 is that step 180 is added after step 130 in FIG. 10.

When the air conditioning ECU 46 acquires the operation value that is a setting resulting from an operation of the operation unit 45 by the occupant in step 130, the air conditioning ECU 46 advances to step 180 where it acquires various types of temperatures of the vehicle. Here, as an example, the air conditioning ECU 46 acquires the outside air temperature detected by the outside air temperature sensor 52, the vehicle cabin interior temperature detected by the vehicle cabin interior sensor 54, and the temperature of the engine cooling water detected by the engine cooling water temperature sensor 66.

Next, when there is no manual operation by the occupant (NO in step 132), the air conditioning ECU 46 acquires the fuel consumption reduction amount (step 134), acquires the fuel consumption amount (step 136), and judges whether or not fuel economy will be improved (step 138). Then, when the result of the judgment is that fuel economy will be improved (YES in step 138), the air conditioning ECU 46 executes the seat heater control, that is, heating by the electrothermal heater.

In the present embodiment, in step 130 the air conditioning ECU 46 acquires data indicating whether or not the eco mode has been selected by an instruction resulting from the eco mode switch. Further, the air conditioning ECU 46 acquires data indicating whether or not the switch 64A of the electrothermal heater 64 is switched on and data indicating whether or not a function as a heating system has been selected as an operation (whether or not a heating instruction switch is on). Further, in judging whether or not it is possible to improve fuel economy in step 138, the air conditioning ECU 46 performs the judgment including the facts that the eco mode has been selected, the electrothermal heater 64 is on, the heating instruction switch is on, and the state resulting from the various types of temperatures of the vehicle that have been acquired is a cold state where the potential for fuel economy improvement is large. That is, the air conditioning ECU 46 judges that fuel economy will be improved when the fuel consumption amount is less than the fuel consumption reduction amount, the fuel-saving effect is given priority, the threshold value for an engine startup is lowered, and the state is a cold state where the potential for fuel economy improvement is large due to the various types of temperatures of the vehicle (described later).

Because of this, in vehicle travel (an operating mode) accompanied by an engine shutdown, the number of occurrences of engine shutdowns can be increased by lowering the reference temperature of the engine cooling water by a predetermined temperature, a heating effect can be obtained early because of the electrothermal heater in a cold state where the temperature is less than a predetermined temperature, and the fuel consumption reduction amount can be increased as a result of the number of occurrences of engine shutdowns being increased. For this reason, although a fuel consumption amount arises due to heating by the electrothermal heater, the fuel consumption amount becomes less than the fuel consumption reduction amount or the fuel consumption amount resulting from the electrothermal heater is offset by the fuel consumption reduction amount, and a heating effect can be obtained while reducing the fuel consumption amount.

Figure 11:
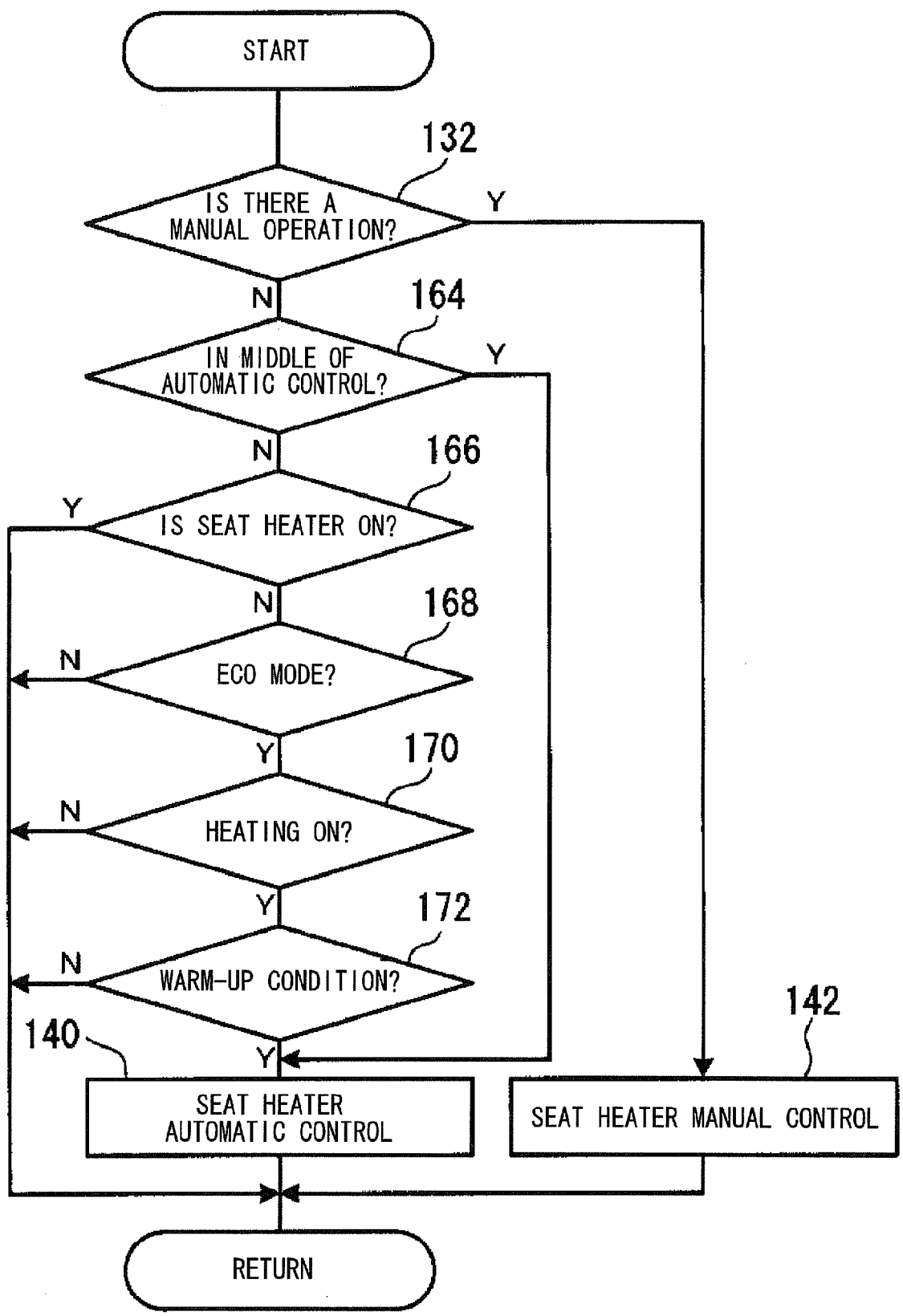
FIG. 11 is a flowchart showing a flow of detailed processing in regard to judging fuel economy improvement pertaining to the third embodiment of the present invention.

Next, the judgment of fuel economy improvement in the present embodiment will be described in detail with reference to FIG. 11. FIG. 11 is a flowchart showing a flow of detailed processing in regard to the judgment of fuel economy improvement. FIG. 11 shows in detail the processing of steps 132 to 142 of FIG. 10.

First, when there is no manual operation by the occupant (NO in step 132), the air conditioning ECU 46 judges in step 164 whether it is in the middle of the seat heater automatic control. When the answer is YES, the air conditioning ECU 46 advances to step 140 where it continues the automatic control, and when the answer is NO, the air conditioning ECU 46 advances to step 166. The seat heater automatic control is canceled only when the aforementioned timer control ends or in a case where there has been a manual operation.

In step 166, whether or not the switch 64A of the electrothermal heater 64 is switched on is judged, in step 168, whether or not the eco mode has been selected by an instruction resulting from the eco mode switch is judged, and in step 170, whether or not a function as a heating system has been selected (whether or not the heating instruction switch is switched on) as an operation is judged. As for the judgment that the electrothermal heater 64 is on, ensuring that the answer is YES only at a timing of one time when the ignition switch has been switched on is preferred. Consequently, in a case where the answer is YES in step 166, the air conditioning ECU 46 ends processing as is without moving to the seat heater automatic control.

In a case where the eco mode has not been selected (NO in step 168), the potential for fuel economy improvement is low, so the air conditioning ECU 46 ends processing as is without moving to the seat heater automatic control. Further, whether the heating instruction switch is on or off is a selection by the occupant, so in a case where the heating instruction switch is off (NO in step 170), the air conditioning ECU 46 may regard this as an instruction that the electrothermal heater 64 is to be off. Because of this, performing heating control with the electrothermal heater alone can be avoided, and the effect of fuel economy improvement can be obtained.

When the electrothermal heater 64 has not been switched on even once (NO in step 166), the mode is the eco mode (YES in step 168), and the electrothermal heater 64 is on (YES in step 170), in step 172 it is judged whether or not the various types of temperatures of the vehicle that have been acquired are consistent with a warm-up condition. This warm-up condition is a condition for judging that the potential for fuel economy to improve is high during heating in which the electrothermal heater 64 has been operated. That is, when the electrothermal heater 64 is operated, electric power is consumed, so unless the effect resulting from an engine shutdown exceeds that consumed electric power—that is, unless the fuel consumption reduction amount resulting from an engine shutdown exceeds the fuel consumption amount corresponding to the consumed electric power—fuel economy will not be improved. For this reason, in the present embodiment, the air conditioning ECU 46 is configured to execute the seat heater automatic control only under a predetermined condition in which an improvement in fuel economy is expected.

That is, in a low-temperature environment in which there is any one of a low outside air temperature, a low vehicle cabin interior temperature, and a low engine cooling water temperature, simple operation of the heating system according to the eco mode causes a drop in fuel economy. On the other hand, in a low-temperature environment (a cold state), by controlling the operation of the heating system assuming an improvement in fuel economy, an improvement in fuel economy can be expected. For example, when the outside air temperature is 0 degrees and the engine is started up, the engine cooling water temperature rises from 0 degrees. At this time, in case where the temperature during blowing preferred as a heating effect is 50 degrees, in a case where the engine cooling water temperature is 60 degrees and the air conditioning system has a setting in which it can blow warm air of 50 degrees, only warm air of 40 degrees can be blown if the engine cooling water temperature is 50 degrees. For this reason, in order to obtain a comfortable heating effect, the engine continues to be driven until the engine cooling water temperature becomes 60 degrees. On the other hand, performing an engine shutdown early is desired for improving fuel economy.

Therefore, when heating by the electrothermal heater 64 is used, it is expected that the feeling of warmth experienced by the occupant will become higher than the actual cabin temperature. For this reason, even if the threshold values of engine startup and shutdown are lowered, a heating feeling that becomes the feeling of warmth experienced by the occupant that is higher than the actual cabin temperature can be provided. That is, by changing the threshold values in accordance with the use of the electrothermal heater 64 and performing the engine-on request control, the potential for fuel economy improvement becomes higher while improving the heating effect.

Incidentally, a vehicular heating system provides warmth to an occupant, so the low-temperature environment (cold state) is any one, or a combination, of a low outside air temperature, a low vehicle cabin interior temperature, and a low engine cooling water temperature. For this reason, in the warm-up condition in which the potential for fuel economy improvement is high during heating, as the cold state, a time when the outside air temperature is less than a first temperature (e.g., 10 degrees), the vehicle cabin interior temperature is less than a second temperature (e.g., 10 degrees), and the engine cooling water temperature is less than a third temperature (e.g., 10 degrees) is most preferred. However, a vehicular heating system also provides warmth to an occupant, so even if at least a time when the vehicle cabin interior temperature is less than the second temperature (e.g., 10 degrees) is employed, an improvement in fuel economy can be expected while improving the heating effect.

Here, a case where temperatures including the outside air temperature, a low vehicle cabin interior temperature, and a low engine cooling water temperature are used has been described, but the embodiment is not limited to this, and it suffices as long as the cold state can be prescribed; the temperature at outlet (TAO), the actual temperature of the electrothermal heater, the amount of time in which the ignition is off, and so forth can be applied.

In this way, by executing the seat heater automatic control when the various types of temperatures of the vehicle are consistent with the warm-up condition, a drop in fuel economy can be suppressed—that is, fuel economy can be improved—while improving the heating effect.

In the processing of FIG. 11, processing for acquiring the fuel consumption reduction amount and the fuel consumption amount is omitted. This is because, as described above, the eco mode is selected, and by performing the judgment according to the warm-up condition, it can be expected that the fuel consumption amount will become less than the fuel consumption reduction amount. That is, this is because the judgments in steps 164 to 172 correspond to the processing of acquiring the fuel consumption reduction amount and the fuel consumption amount (steps 134 and 136) and judging fuel economy improvement (YES in step 138).

As described above, in the present embodiment, by determining that there exists a fuel economy improving state in the cold state where at least the temperature of the vehicle cabin interior is less than a predetermined temperature and combining heating by the air conditioning system and heating by the electrothermal heater, a heating effect can be obtained early. Further, intermittent engine driving in which the number of occurrences of engine shutdowns is increased by lowering the temperature of the threshold values of the engine cooling water for engine startup and shutdown becomes possible, and the fuel consumption reduction amount can be increased. For this reason, a heating effect can be obtained while reducing the fuel consumption amount.

It is preferred that FIG. 11 be repeatedly executed while the ignition switch is on after the ignition switch has been switched on. This is for realizing performing processing giving priority to an instruction from the occupant resulting from a manual operation and always performing the determination of the fuel economy improving state. For this purpose, it is preferred that the processing of FIG. 10 be repeatedly executed while the ignition switch is on. At this time, the processing of steps 144 and 146 can be configured to be executed only when the seat heater control is being executed.

Fourth Embodiment

Next, a vehicular air conditioning system pertaining to a fourth embodiment will be described. The present embodiment is an embodiment in which the present invention is applied when obtaining a heating effect by performing heating in accordance with the seating position of an occupant seated in a seat. The present embodiment is capable of being applied to each of the above embodiments. The basic configuration of the vehicular air conditioning system of the present embodiment is the same as that of the first embodiment, so in regard to identical portions, identical reference signs will be given thereto and detailed description thereof will be omitted.

Next, the operation during heating control in the vehicular air conditioning system 10 pertaining to the present embodiment will be described.

Figure 12:
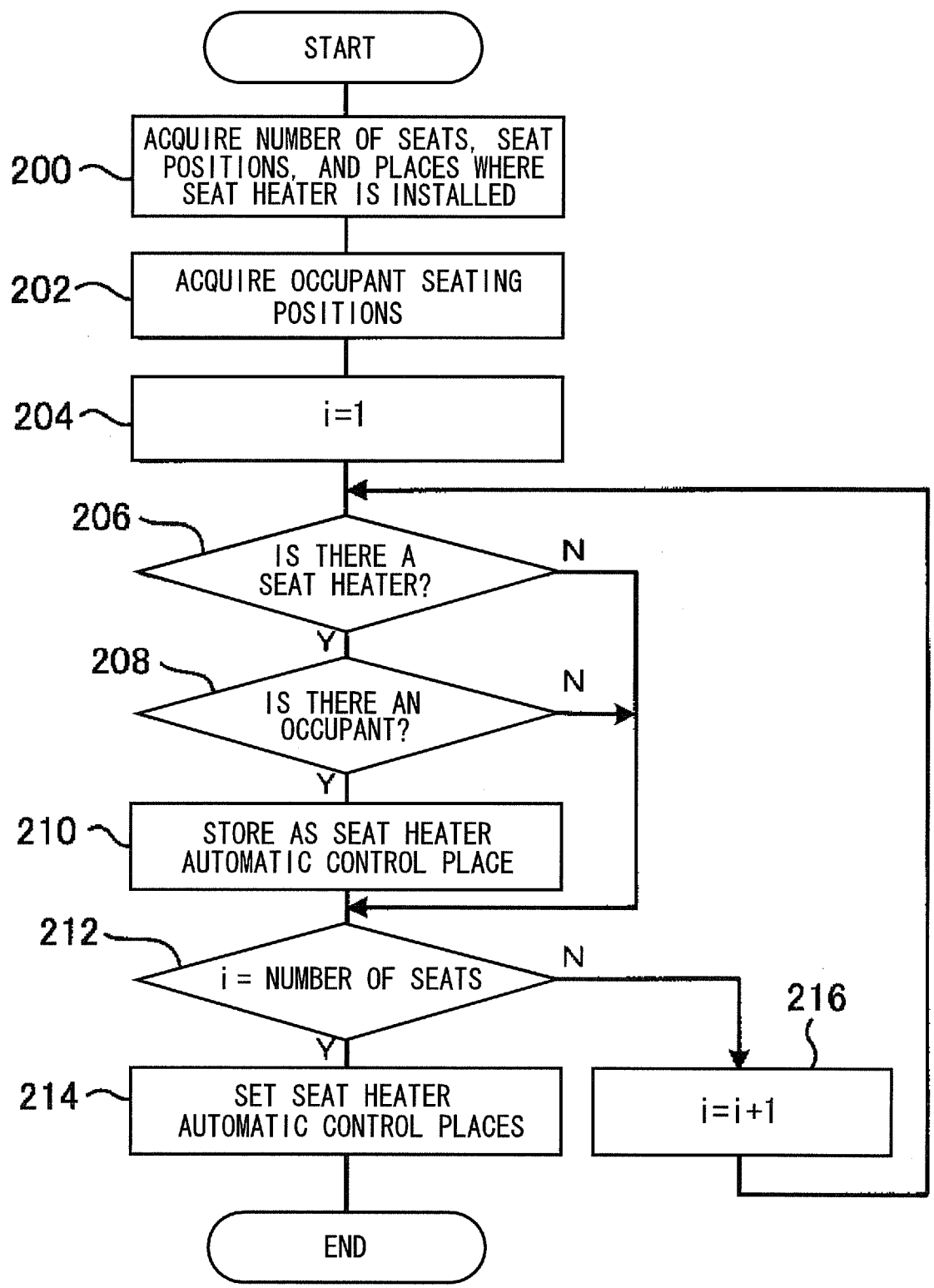
FIG. 12 is a flowchart showing a flow of processing for performing heating control in accordance with the seating position of an occupant seated in a seat in regard to seat heater control executed by an air conditioning ECU in a vehicular air conditioning system of a fourth embodiment of the present invention.

FIG. 12 is a flowchart showing a flow of processing for performing heating control in accordance with the seating position of an occupant seated in a seat in regard to the seat heater control executed by the air conditioning ECU 46 in the vehicular air conditioning system 10 of the present embodiment. FIG. 12 is executed immediately before the processing of step 140 of FIG. 1 (or between step 138 and step 140).

First, in step 200, the number of seats, the positions of those seats, and the places where the electrothermal heater is installed are acquired by reading a predetermined number of seats and predetermined installation positions of the electrothermal heater 64 disposed in the vehicle cabin interior as a result of detection by the heater switch 64A for the occupant to switch the electrothermal heater 64 on and off. In the next step 202, the air conditioning ECU 46 acquires the seating positions of the occupants and the number of seated people from the result of detection by the occupant seating position sensor 67. In the next step 204, the air conditioning ECU 46 initially sets a number of times of repeat processing i (i=1), and next, in step 206, whether or not the electrothermal heater is installed in the seat corresponding to the initial value (i=1) is judged. In a case where the electrothermal heater is not installed, the air conditioning ECU 46 advances to step 212, and in a case where the electrothermal heater is installed, the air conditioning ECU 46 advances to step 208.

In step 208, the air conditioning ECU 46 judges whether or not an occupant is seated in the corresponding seat. When an occupant is not seated, the air conditioning ECU 46 advances to step 212, and in a case where an occupant is seated, the air conditioning ECU 46 stores the corresponding seat as a seat heater automatic control target seat place in step 210 and then advances to step 212. In step 212, whether or not the number of repeat times i has reached the number of seats (i=number of seats) is judged, and when the answer is NO, the air conditioning ECU 46 increments the number of repeat times i in step 216 (i=i+1) and then returns to step 206.

On the other hand, when the answer is YES in step 212 and the number of repeat times has reached the number of seats, the air conditioning ECU 46 advances to step 214 where it sets the seat heater automatic control target seat that was stored in step 210 to a control target seat in order to automatically control it and then ends the present routine. Thereafter, the aforementioned seat heater automatic control is executed in regard to places where the electrothermal heater 64 is installed in the seats in which occupants are seated.

Because of this, automatic control only in places where the electrothermal heater is installed is executed, unnecessary control with respect to electrothermal heaters that are not installed can be eliminated, and the fuel consumption amount can be reduced. Further, because automatic control is executed only in places where occupants are seated and electrothermal heaters are installed, a heating effect can be provided with respect to occupants expecting a heating effect, unnecessary control can be eliminated, and the fuel consumption amount can be reduced.

The electrothermal heater 64 can be set on and off by an operation by the occupant. There are cases where the occupant intentionally switches off the electrothermal heater 64 when the occupant judges that heating by the electrothermal heater 64 is unnecessary. Therefore, by configuring the air conditioning ECU 46 to control heating in regard to the electrothermal heater 64 in an on state, unnecessary control can be eliminated while reflecting the intention of the occupant, and the fuel consumption amount can be reduced.

Figure 13:
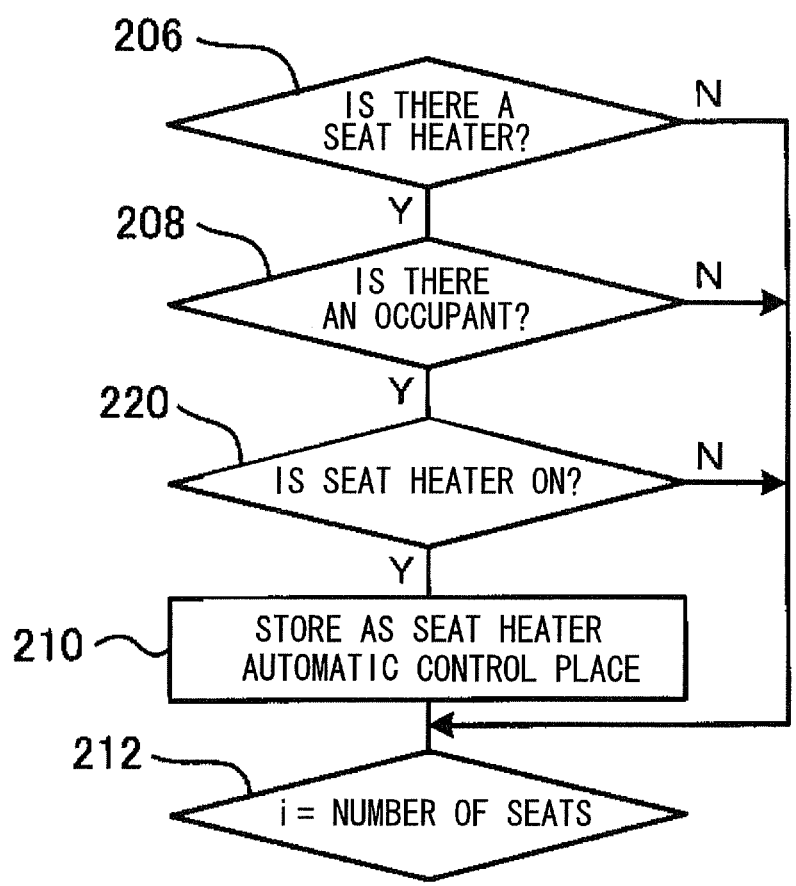
FIG. 13 is an explanatory diagram of processing that reflects the intention of an occupant pertaining to the fourth embodiment of the present invention.

Specifically, as shown in FIG. 13, step 220, in which the air conditioning ECU 46 judges whether or not the electrothermal heater 64 is in an on state, is added between step 208 and step 210 of FIG. 12. When the electrothermal heater 64 is in an on state, the answer is YES in step 220 and the air conditioning ECU 46 stores the corresponding seat as a seat heater automatic control target seat place. On the other hand, when the electrothermal heater 64 is in an off state, the air conditioning ECU 46 allows the intention of the occupant to be reflected and advances to step 212 without storing the corresponding seat as a seat heater automatic control target.

In this way, in the present embodiment, heating is performed in accordance with the seated position of an occupant seated in a seat and the installation position of the electrothermal heater, so a heating effect can be provided with respect to an occupant expecting a heating effect, unnecessary control can be eliminated, and the fuel consumption amount can be reduced.

All documents, patent applications, and technical standards cited in this specification are incorporated by reference herein to the same extent as if each individual publication, patent application, and technical standard were specifically and individually indicated to be incorporated by reference.

The invention claimed is:

1. A vehicular heating control system comprising:
   a fuel consumption reduction amount acquiring unit that acquires a fuel consumption reduction amount in an operating mode accompanied by an engine shutdown;
   a fuel consumption amount acquiring unit for acquiring a fuel consumption amount corresponding to electric power consumption during heating by an electrothermal heater that heats a vehicle cabin interior with heat resulting from an electric power supply and that is disposed separately from a heating unit, which heats the vehicle cabin interior using engine cooling water as a heat source during heating;
   a determining unit that determines whether there exists a fuel economy improving state when the fuel consumption amount that has been acquired by the fuel consumption amount acquiring unit is less than the fuel consumption reduction amount that has been acquired by the fuel consumption reduction amount acquiring unit; and
   a control unit that controls heating by the electrothermal heater when it has been determined by the determining unit whether there exists a fuel economy improving state.

2. The vehicular heating control system according to claim 1, further comprising a traveling state detecting unit that detects a low-load traveling state in which a number of occurrences of engine shutdowns is equal to or greater than a predetermined number of occurrences,
   wherein
   the heating unit includes
      a requesting unit in which a reference temperature of the engine cooling water for heating is predetermined and which makes an engine startup request or an engine shutdown request based on the engine cooling water temperature and the reference temperature, and
      a changing unit that performs a change that lowers the reference temperature of the engine cooling water by a predetermined temperature in the operating mode accompanied by an engine shutdown, and
   the determining unit determines whether there exists a fuel economy improving state when, in the operating mode accompanied by an engine shutdown that lowers the reference temperature of the engine cooling water by a predetermined temperature, the fuel consumption amount is less than the fuel consumption reduction amount and the detection result of the traveling state detecting unit is the low-load traveling state.

3. The vehicular heating control system according to claim 1, further comprising a temperature acquiring unit that acquires a temperature of the vehicle cabin interior,
   wherein
   the heating unit includes
      a requesting unit in which a reference temperature of the engine cooling water for heating is predetermined and which makes an engine startup request or an engine shutdown request based on the engine cooling water temperature and the reference temperature, and
      a changing unit that performs a change that lowers the reference temperature of the engine cooling water by a predetermined temperature in the operating mode accompanied by an engine shutdown, and
      the determining unit determines whether there exists a fuel economy improving state in the operating mode accompanied by an engine shutdown that lowers the reference temperature of the engine cooling water by a predetermined temperature and in a cold state where the temperature of the vehicle cabin interior that has been acquired by the temperature acquiring unit is less than a predetermined temperature.

4. The vehicular heating control system according to claim 1, wherein
   the heating unit includes an air conditioning unit that calculates a target temperature at an outlet of conditioned air for air conditioning the vehicle cabin interior and air conditions the vehicle cabin interior in such a way as to achieve the target temperature at the outlet and which is equipped with a heat applying unit that applies heat to the conditioned air using the engine cooling water as a heat source during heating,
   the electrothermal heater is at least at one of an occupant-contacting heater and an electric heater, and
   the control unit controls heating by the air conditioning unit and the electrothermal heater.

5. The vehicular heating control system according to claim 3, wherein
   the temperature detecting unit further acquires at least one of an outside air temperature and the cooling water temperature, and
   the determining unit includes a deciding unit that decides the cold state based on the vehicle cabin interior temperature and at least one of the outside air temperature and the cooling water temperature that have been acquired by the temperature acquiring unit.

6. The vehicular heating control system according to claim 4, wherein the air conditioning unit includes a blower fan that supplies the conditioned air to the vehicle cabin interior, and the control unit controls heating by the air conditioning unit by changing a wind force of the blower fan.

7. The vehicular heating control system according to claim 1, wherein the control unit controls heating by the electrothermal heater by changing in stages the temperature of the heat resulting from the electric power supply.

8. The vehicular heating control system according to claim 1, further comprising a seating position acquiring unit that acquires a seating position of an occupant, wherein the electrothermal heater is an occupant-contacting heater, and the control unit controls heating in regard to the electrothermal heater in the seating position of the occupant that has been acquired by the seating position acquiring unit.

9. A vehicular heating control method comprising:

a fuel consumption reduction amount acquiring step that acquires a fuel consumption reduction amount in an operating mode accompanied by an engine shutdown;

a fuel consumption amount acquiring step that acquires a fuel consumption amount corresponding to electric power consumption during heating by an electrothermal heater that heats a vehicle cabin interior with heat resulting from an electric power supply and that is disposed separately from a heating unit, which heats the vehicle cabin interior using engine cooling water as a heat source during heating;

a determining step that determines whether there exists a fuel economy improving state when the fuel consumption amount that has been acquired by the fuel consumption amount acquiring step is less than the fuel consumption reduction amount that has been acquired by the fuel consumption reduction amount acquiring step; and a control step that controls heating by the electrothermal heater when it has been determined by the determining step whether there exists a fuel economy improving state.

10. A non-transitory computer-readable storage medium storing a vehicular heating control program for causing a computer to execute a vehicular heating control method comprising:

a fuel consumption reduction amount acquiring step that acquires a fuel consumption reduction amount in an operating mode accompanied by an engine shutdown;

a fuel consumption amount acquiring step that acquires a fuel consumption amount corresponding to electric power consumption during heating by an electrothermal heater that heats a vehicle cabin interior with heat resulting from an electric power supply and that is disposed separately from a heating unit, which heats the vehicle cabin interior using engine cooling water as a heat source during heating;

a determining step that determines whether there exists a fuel economy improving state when the fuel consumption amount that has been acquired by the fuel consumption amount acquiring step is less than the fuel consumption reduction amount that has been acquired by the fuel consumption reduction amount acquiring step; and a control step that controls heating by the electrothermal heater when it has been determined by the determining step whether there exists a fuel economy improving state.

* * * * *